United States Patent
Yoda et al.

(10) Patent No.: US 11,796,793 B2
(45) Date of Patent: Oct. 24, 2023

(54) OPTICAL DEFLECTOR, DEFLECTION APPARATUS, DISTANCE MEASURING APPARATUS, IMAGE PROJECTING APPARATUS, AND MOVABLE BODY

(71) Applicants: Mitsuhiro Yoda, Tokyo (JP); Yukito Sato, Miyagi (JP); Mizuki Shinkawa, Kanagawa (JP); Goichi Akanuma, Kanagawa (JP); Shuichi Suzuki, Kanagawa (JP)

(72) Inventors: Mitsuhiro Yoda, Tokyo (JP); Yukito Sato, Miyagi (JP); Mizuki Shinkawa, Kanagawa (JP); Goichi Akanuma, Kanagawa (JP); Shuichi Suzuki, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 434 days.

(21) Appl. No.: 16/953,826

(22) Filed: Nov. 20, 2020

(65) Prior Publication Data
US 2021/0157129 A1    May 27, 2021

(30) Foreign Application Priority Data

Nov. 27, 2019  (JP) ................................. 2019-214517
Sep. 28, 2020  (JP) ................................. 2020-162066

(51) Int. Cl.
*G02B 26/08*  (2006.01)
*G02B 26/10*  (2006.01)
(Continued)

(52) U.S. Cl.
CPC .......... *G02B 26/105* (2013.01); *G02B 7/182* (2013.01); *G02B 5/08* (2013.01)

(58) Field of Classification Search
CPC ........ G02B 26/105; G02B 7/182; G02B 5/08; G02B 26/101; G02B 26/0858
See application file for complete search history.

(56) References Cited

U.S. PATENT DOCUMENTS 6,177,667 B1   1/2001  Fujita et al.
6,972,883 B2  12/2005  Fujii et al.
(Continued)

FOREIGN PATENT DOCUMENTS

JP       4926596      5/2012
JP    2013-020124     1/2013
(Continued)

*Primary Examiner* — Euncha P Cherry
(74) *Attorney, Agent, or Firm* — IPUSA, PLLC

(57) ABSTRACT

An optical deflector includes a mirror configured to reflect light; a pair of support portions each having an end connected to the mirror, and configured to support the mirror; first actuators connected to the respective support portions, and configured to deform the support portions so as to cause the mirror to oscillate about a first axis; a movable frame configured to support the first actuators; and second actuators connected to the movable frame and disposed opposite to the first actuators, with the support portions being interposed between the first actuators and the second actuators. The second actuators are not connected to the support portions. The first actuators and the second actuators bend and deform in the same direction.

11 Claims, 19 Drawing Sheets

(51) Int. Cl.
  *G02B 7/182*   (2021.01)
  *G02B 5/08*    (2006.01)

(56) References Cited

U.S. PATENT DOCUMENTS

| | | |
|---|---|---|
| 7,068,296 B2 | 6/2006 | Hayashi et al. |
| 7,190,507 B2 | 3/2007 | Sato |
| 7,221,493 B2 | 5/2007 | Fujii et al. |
| 7,417,780 B2 | 8/2008 | Fujii et al. |
| 7,529,011 B2 | 5/2009 | Fujii |
| 7,529,455 B2 | 5/2009 | Suzuki et al. |
| 7,593,029 B2 | 9/2009 | Satoh et al. |
| 8,054,327 B2 | 11/2011 | Satoh et al. |
| 8,147,069 B2 | 4/2012 | Seo et al. |
| 8,174,750 B2 | 5/2012 | Akanuma et al. |
| 8,199,389 B2 | 6/2012 | Eiji et al. |
| 8,395,834 B2 | 3/2013 | Akanuma et al. |
| 8,462,412 B2 | 6/2013 | Sakai et al. |
| 8,483,523 B2 | 7/2013 | Nakagawa et al. |
| 8,553,306 B2 | 10/2013 | Saitoh et al. |
| 8,654,424 B2 | 2/2014 | Tsukamoto et al. |
| 8,830,551 B2 | 9/2014 | Kitazawa et al. |
| 8,897,614 B2 | 11/2014 | Suzuki et al. |
| 9,036,237 B2 | 5/2015 | Hayashi et al. |
| 9,291,817 B2 | 3/2016 | Hashiguchi et al. |
| 9,304,228 B2 | 4/2016 | Nakamura et al. |
| 9,323,048 B2 | 4/2016 | Tani |
| 9,448,402 B2 | 9/2016 | Akanuma et al. |
| 9,575,312 B2 | 2/2017 | Akanuma |
| 9,766,450 B2 | 9/2017 | Nakagawa et al. |
| 10,119,862 B2 | 11/2018 | Suzuki et al. |
| 10,429,638 B2 | 10/2019 | Hashiguchi et al. |
| 10,459,218 B2 | 10/2019 | Suzuki et al. |
| 10,544,032 B2 | 1/2020 | Fujishima et al. |
| 10,793,418 B2 | 10/2020 | Shinkawa et al. |
| 2007/0171500 A1* | 7/2007 | Jeong .......... G02B 26/0858 359/224.1 |
| 2008/0043310 A1 | 2/2008 | Sato |
| 2018/0267293 A1 | 9/2018 | Fujishima et al. |
| 2018/0290460 A1* | 10/2018 | Nakagawa ......... G02B 26/0858 |
| 2019/0391394 A1 | 12/2019 | Shinkawa et al. |
| 2020/0183151 A1 | 6/2020 | Nanjyo et al. |

FOREIGN PATENT DOCUMENTS

| | | |
|---|---|---|
| JP | 5506976 | 5/2014 |
| JP | 6055701 | 12/2016 |
| JP | 6297823 | 3/2018 |

* cited by examiner

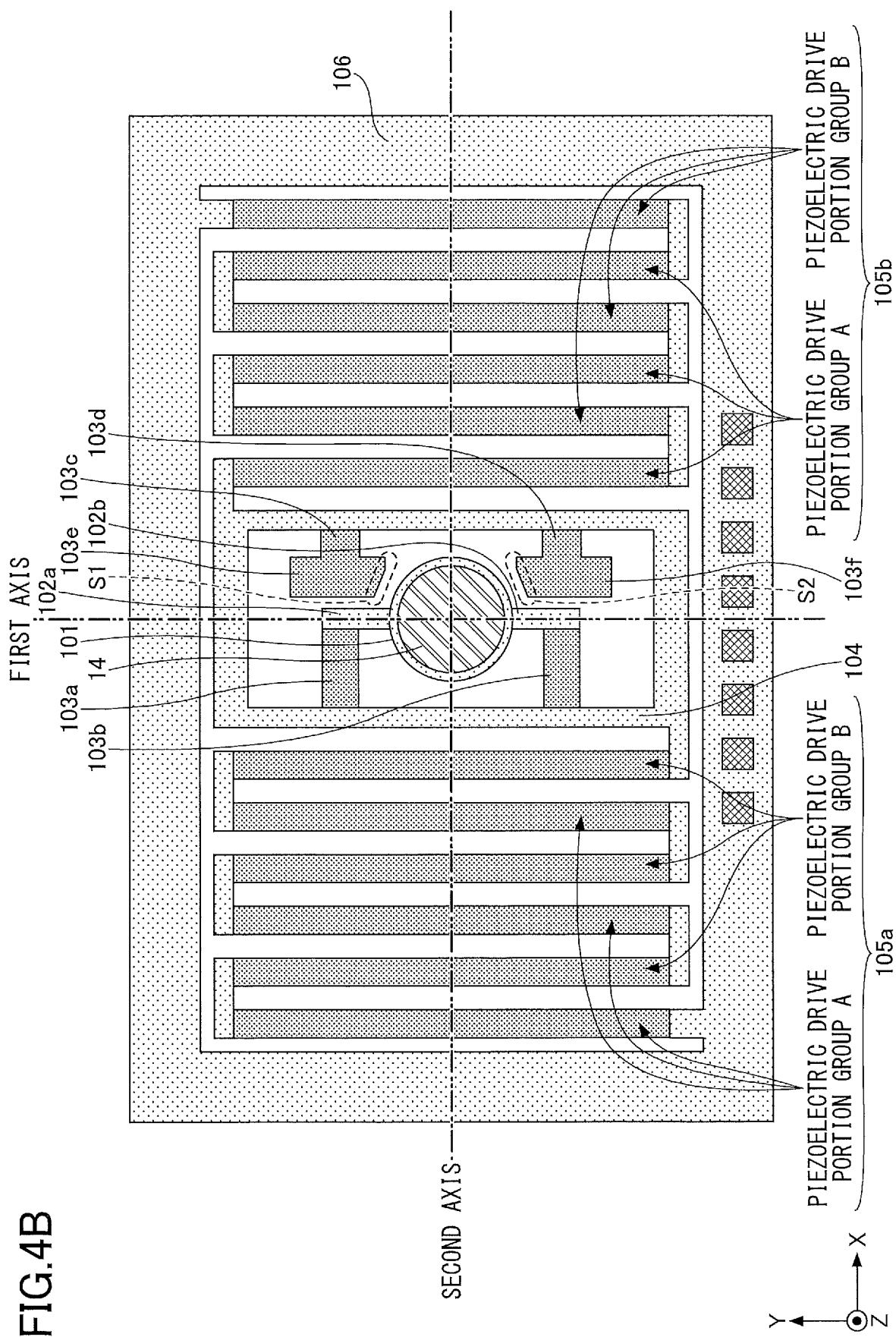

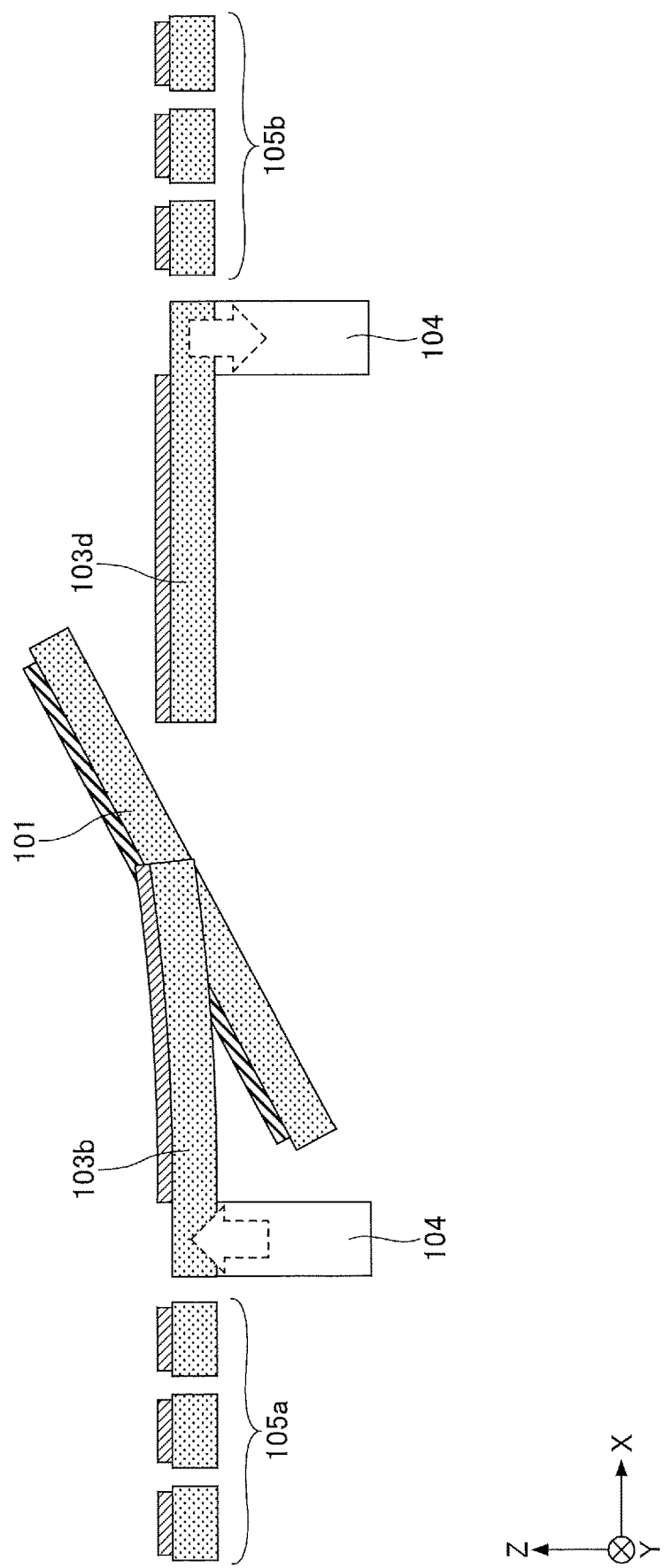

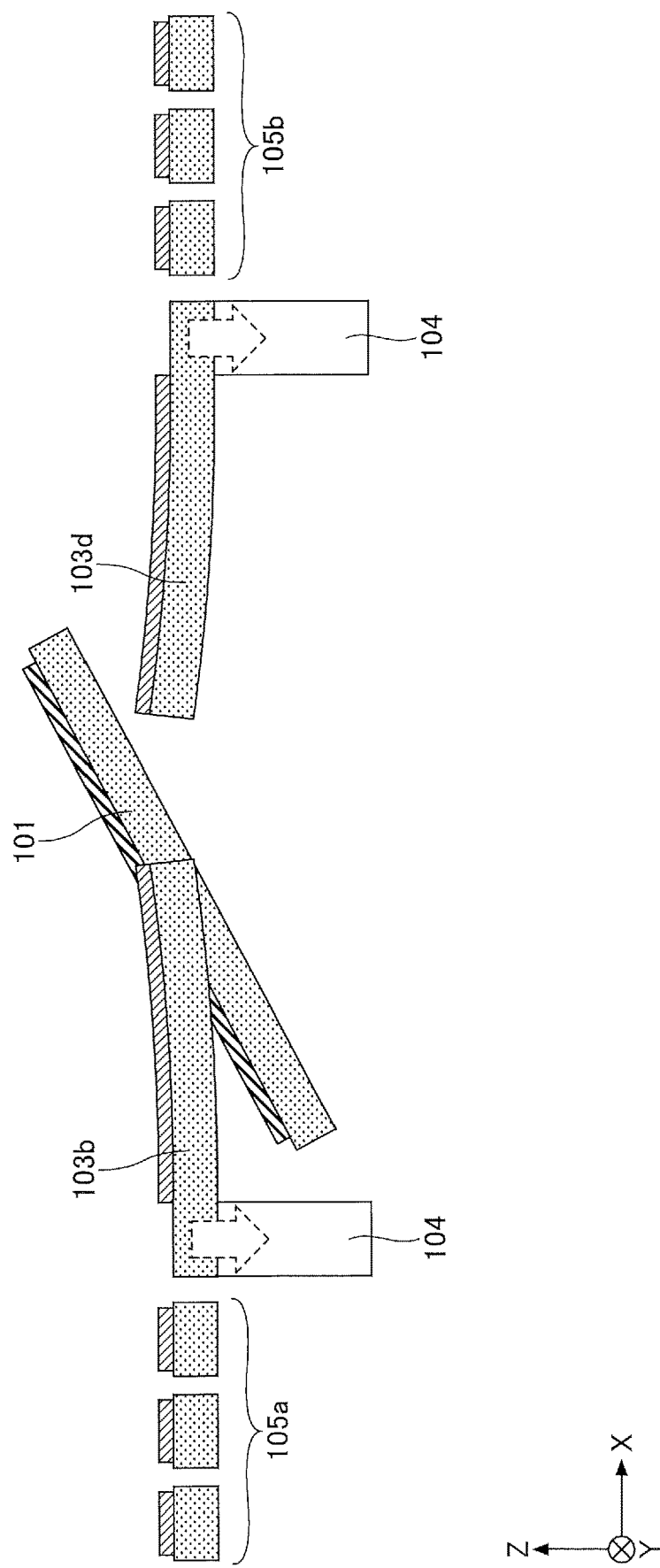

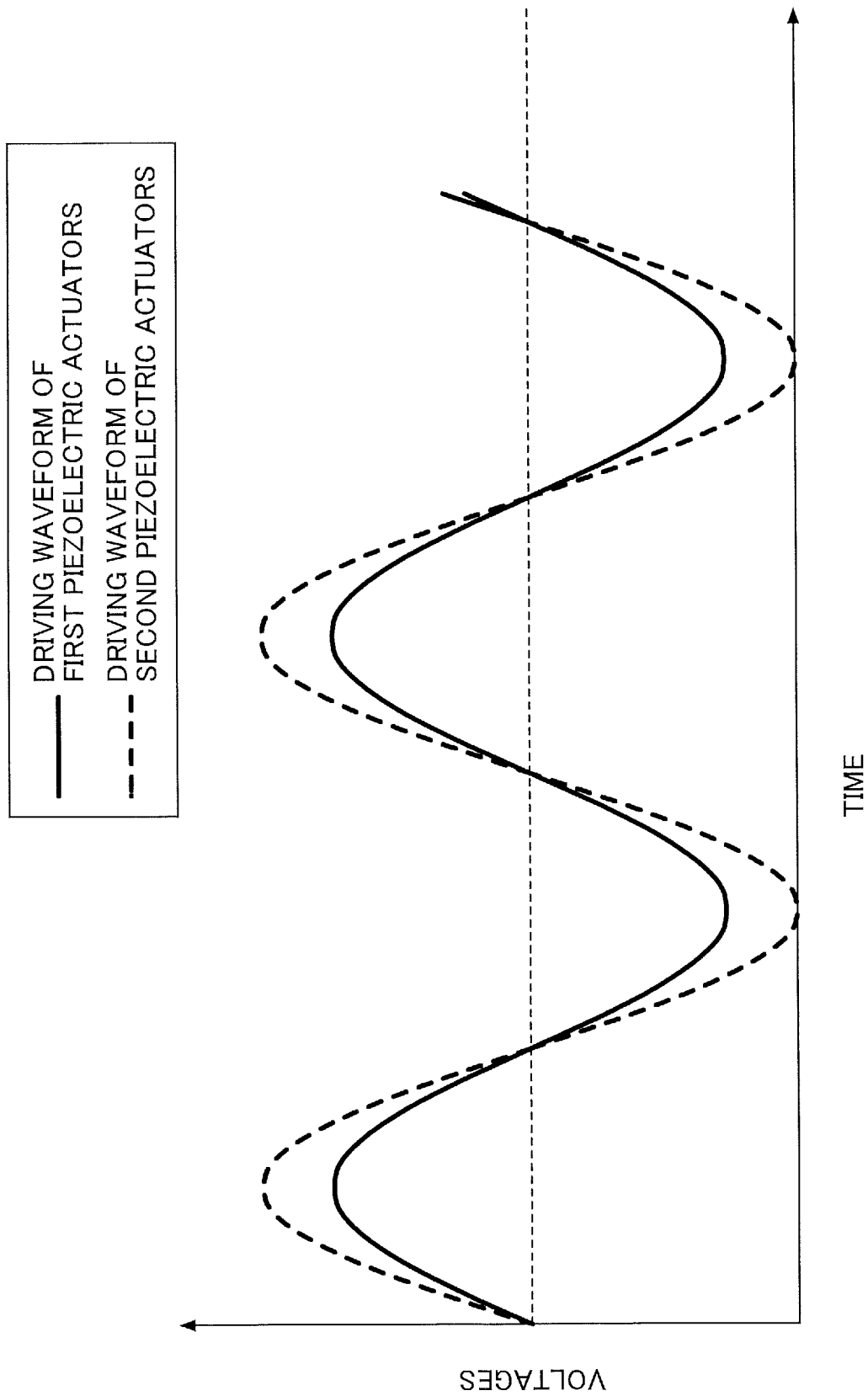

OPTICAL DEFLECTOR, DEFLECTION APPARATUS, DISTANCE MEASURING APPARATUS, IMAGE PROJECTING APPARATUS, AND MOVABLE BODY

CROSS-REFERENCE TO RELATED APPLICATIONS

The present application claims priority under 35 U.S.C. § 119 to Japanese Patent Application No. 2019-214517, filed on Nov. 27, 2019, and Japanese Patent Application No. 2020-162066, filed on Sep. 28, 2020, the entire contents of which are incorporated herein by reference.

BACKGROUND OF THE INVENTION

1. Field of the Invention

The disclosures herein relate to an optical deflector, a deflection apparatus, a distance measuring apparatus, an image projecting apparatus, and a movable body.

2. Description of the Related Art

In recent years, along with the development of a micromachining technology that applies a semiconductor manufacturing technology, the development of micro-electro mechanical systems (MEMS) devices manufactured by micromachining silicon or glass is advancing.

As a MEMS device, a two-dimensional optical deflector is known. The two-dimensional optical deflector includes piezoelectric actuators configured by thin-film piezoelectric materials, a mirror unit having a reflective surface, torsion bars, and beams (elastic beams), which are integrally formed on a wafer. The two-dimensional optical deflector uses the piezoelectric actuators to drive the mirror unit (to cause the mirror unit to oscillate).

The above-described two-dimensional optical deflector is configured such that a support layer of the mirror unit and a support layer of the beams have different thicknesses (Patent Document 1, for example).

However, with such a two-dimensional optical deflector according to the related art, one pair or two pairs of first piezoelectric actuators are disposed opposite to each other with torsion bars being interposed therebetween, and a first alternating current voltage applied to piezoelectric actuators, of the one pair or two pairs of first piezoelectric actuators, connected to one torsion bar and a second alternating current voltage applied to piezoelectric actuators connected to the other torsion bar are out of phase by 180 degrees. Therefore, the oscillation of the first piezoelectric actuators (main scanning), which are out of phase by 180 degrees, may be transmitted to a movable frame and second piezoelectric actuators (sub-scanning), which are connected to the first piezoelectric actuators. As a result, the movable frame may be subjected to unintended rotational movement (oscillation) about a rotation axis (first axis). For this reason, when such an optical deflector is used for image formation, a high-quality image cannot be formed.

Related-Art Documents

Patent Documents

Patent Document 1: Japanese Patent No. 5506976

SUMMARY OF THE INVENTION

According to at least one embodiment, an optical deflector includes a mirror configured to reflect light; a pair of support portions each having an end connected to the mirror, and configured to support the mirror; first actuators connected to the respective support portions, and configured to deform the support portions so as to cause the mirror to oscillate about a first axis; a movable frame configured to support the first actuators; and second actuators connected to the movable frame and disposed opposite to the first actuators, with the support portions being interposed between the first actuators and the second actuators. The second actuators are not connected to the support portions. The first actuators and the second actuators bend and deform in the same direction.

BRIEF DESCRIPTION OF THE DRAWINGS

Other objects and further features of the present invention will be apparent from the following detailed description when read in conjunction with the accompanying drawings, in which:

FIG. 4B is a structure diagram (3) illustrating the optical deflector according to the first embodiment;

FIG. 5 is a diagram (1) illustrating the driving of the optical deflector according to the first embodiment;

FIG. 6 is a diagram (2) illustrating the driving of the optical deflector according to the first embodiment;

FIG. 7 is a graph indicating driving waveforms of the optical deflector according to the first embodiment;

DESCRIPTION OF THE EMBODIMENTS

Figure 1:
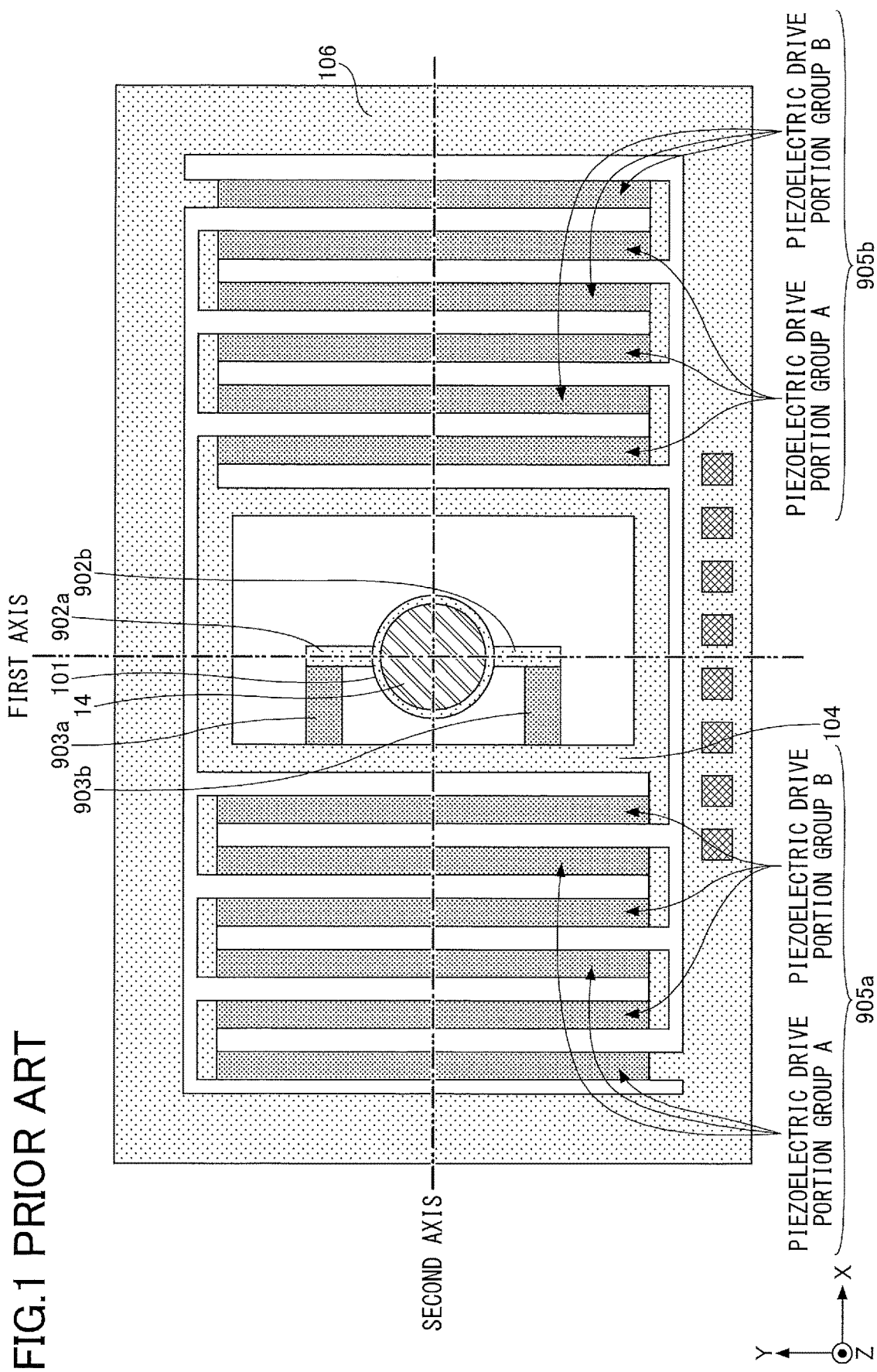
FIG. 1 is a diagram illustrating an example of an optical deflector of a singly supported structure.

It is a general object of the described embodiments to provide an optical deflector that enables the formation of a high-quality image when the optical deflector is used for image formation.

In the following, embodiments of the present invention will be described with reference to the accompanying drawings. In the drawings, the same elements are denoted by the same numerals, and a duplicate description thereof may be omitted.

First Embodiment

First, an optical deflector in which two or four piezoelectric actuators for deflecting light in a main-scanning direction are coupled to a mirror will be described.

FIG. 1 is a diagram illustrating an optical deflector of a singly supported structure in which two piezoelectric actuators 903a and 903b are both coupled to a mirror 101.

The mirror 101 includes a reflective surface 14 that reflects light. Torsion bars 902a and 902b couple the mirror 101 to the piezoelectric actuators 903a and 903b. The torsion bars 902a support the mirror 101 such that the mirror 101 oscillates about a first axis (rotation axis). A movable frame 104 supports the piezoelectric actuators 903a and 903b within the movable frame 104.

A pair of piezoelectric actuators 905a and 905b is provided outside the movable frame 104. The pair of piezoelectric actuators 905a and 905b supports the movable frame 104 such that the movable frame 104 is movable about a second axis. The piezoelectric actuators 905a and 905b are provided between the movable frame 104 and a fixed frame 106. The fixed frame 106 supports the piezoelectric actuators 905a and 905b.

Although not illustrated, lower electrodes, piezoelectric portions, and upper electrodes are formed on the piezoelectric actuators 903a and 903b. Specifically, the lower electrodes are formed on the piezoelectric actuators 903a and 903b, the piezoelectric portions are formed on the lower electrodes, and the upper electrodes are formed on the piezoelectric portions. When a drive voltage is applied to the piezoelectric actuators 903a and 903b through the upper electrodes and the lower electrodes, the piezoelectric portions deform. The deformation of the piezoelectric portions causes the piezoelectric actuators 903a and 903b, which are supported by the movable frame 104 and connected to the torsion bars 902a and 902b, to bend and deform. As a result, the torsion bars 902a and 902b twist.

Figure 2:
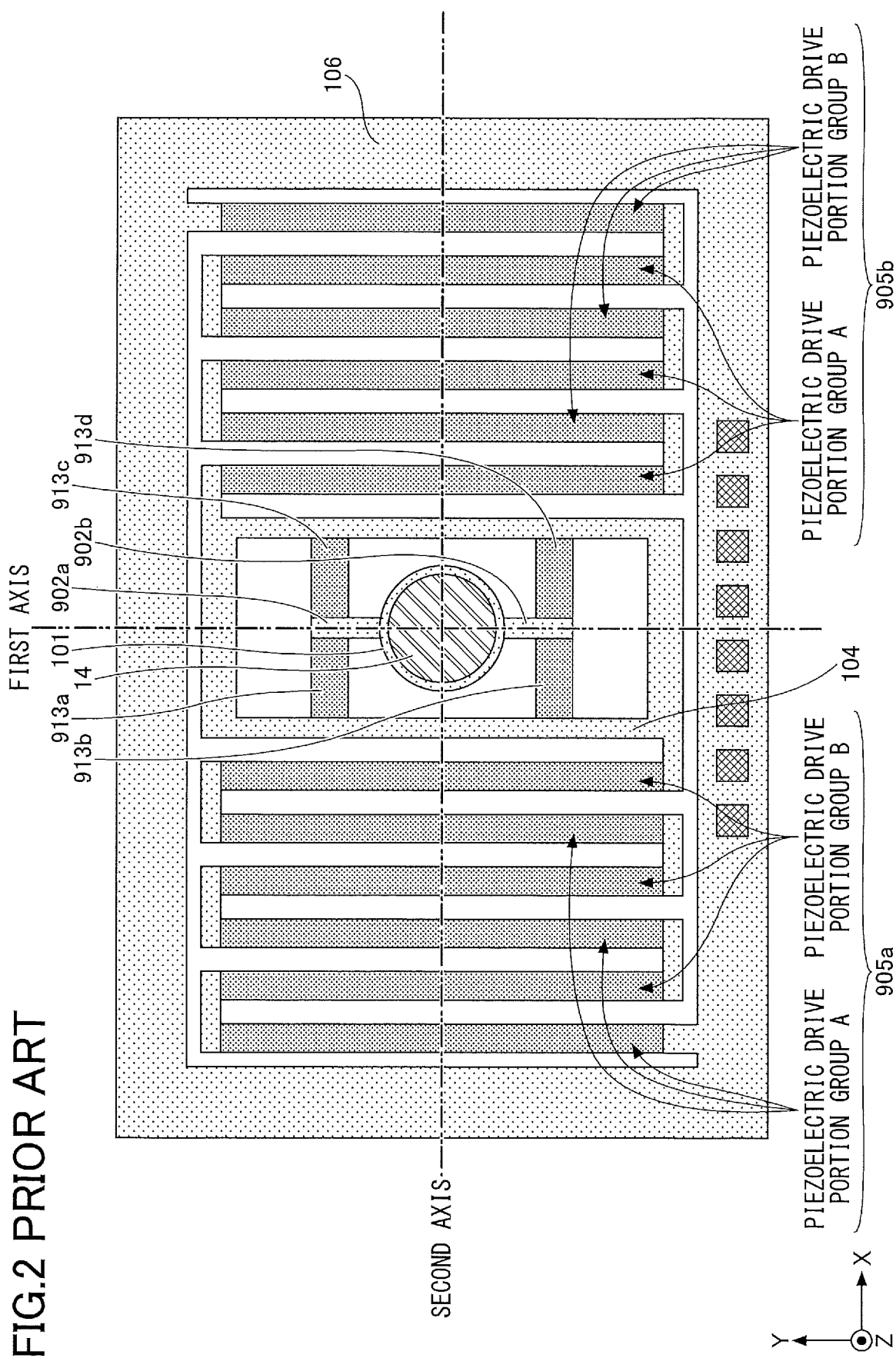
FIG. 2 is a diagram illustrating an example of an optical deflector of a doubly supported structure.

FIG. 2 is a diagram illustrating an optical deflector of a doubly supported structure in which four piezoelectric actuators 913a, 913b, 913c, and 913d are all coupled to a mirror 101.

Torsion bars 902a and 902b couple the mirror 101 to the piezoelectric actuators 913a, 913b, 913c, and 913d. The torsion bars 902a and 902b support the mirror 101 such that the mirror 101 oscillates about the first axis. A movable frame 104 supports the piezoelectric actuators 913a, 913b, 913c, and 913d within the movable frame 104.

Although not illustrated, lower electrodes, piezoelectric portions, and upper electrodes are formed on the piezoelectric actuators 913a, 913b, 913c, and 913d. Specifically, the lower electrodes are formed on the piezoelectric actuators 913a, 913b, 913c, and 913d, the piezoelectric portions are formed on the lower electrodes, and the upper electrodes are formed on the piezoelectric portions. When drive voltages are applied to the piezoelectric actuators 913a, 913b, 913c, and 913d through the upper electrodes and the lower electrodes, the piezoelectric portions deform. The deformation of the piezoelectric portions causes the piezoelectric actuators 913a, 913b, 913c, and 913d, which are supported by the movable frame 104 and connected to the torsion bars 902a and 902b, to bend and deform. As a result, the torsion bars 902a and 902b twist.

In an optical deflector as illustrated in FIG. 1 or FIG. 2, there may be a case where the oscillation of piezoelectric actuators on a main scanning side may be transmitted to a movable frame and piezoelectric actuators on a sub-scanning side, which are connected to the piezoelectric actuators on the main scanning side. As a result, the movable frame may be subjected to unintended excessive movement (oscillation) about the first axis (rotation axis). If such unintended excessive oscillation occurs, it would be difficult to perform desired optical deflection. For example, if the optical deflector as illustrated in FIG. 1 or FIG. 2 is used to form an image, dark lines may appear in the formed image, thereby decreasing the quality of the image. In view of the above, an optical deflector that enables the formation of a high-quality image is desired.

Figure 3:
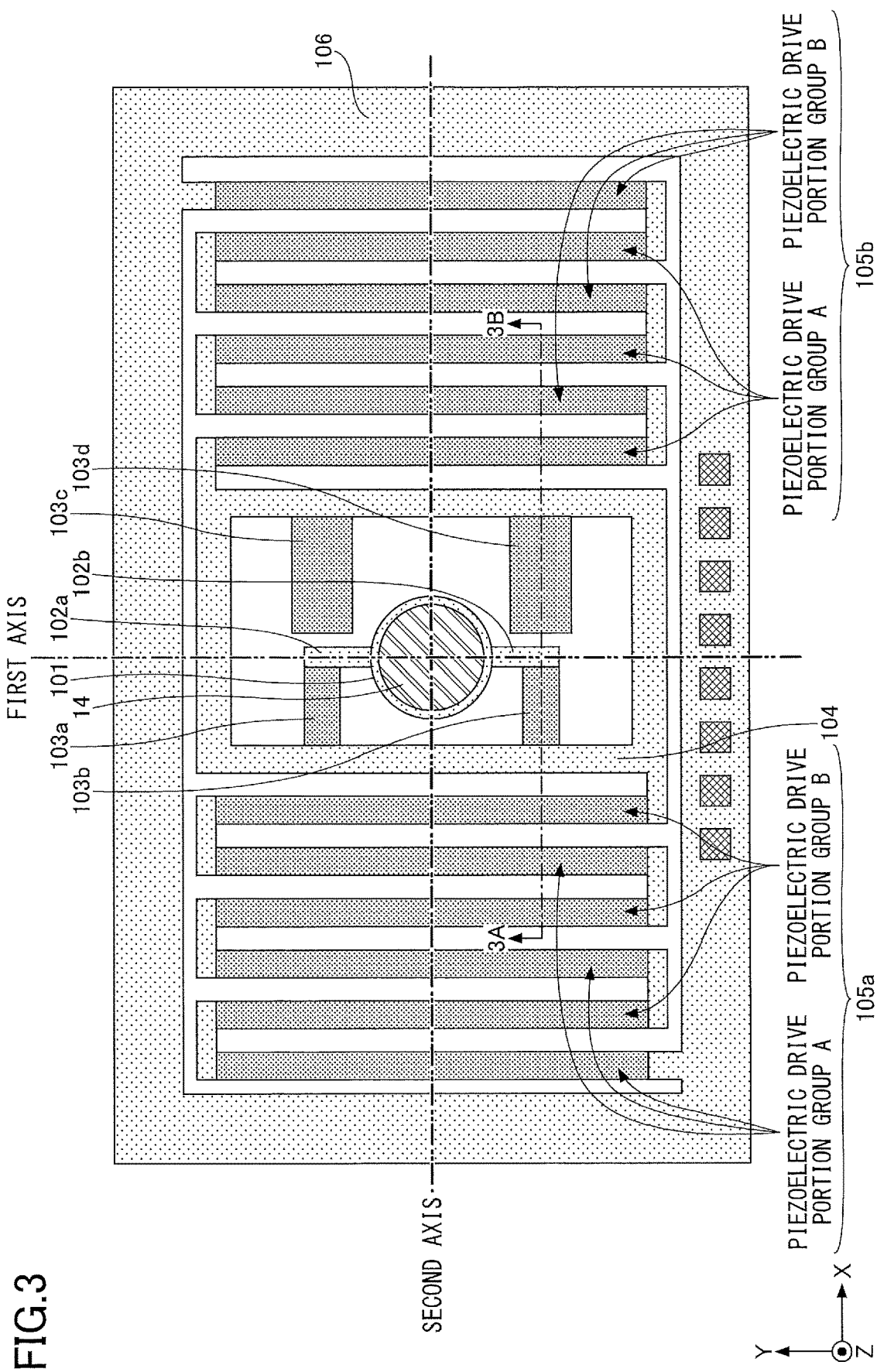
FIG. 3 is a structure diagram (1) illustrating an optical deflector according to a first embodiment.

In the following, an optical deflector according to a first embodiment will be described with reference to FIG. 3. The optical deflector according to the first embodiment is a two-dimensional optical deflector that uses piezoelectric actuator as illustrated in FIG. 3.

The optical deflector according to the present embodiment includes a mirror 101, a pair of torsion bars 102a and 102b, a pair of first piezoelectric actuators 103a and 103b, a pair of second piezoelectric actuators 103c and 103d, a movable frame 104, third piezoelectric actuators 105a and 105b, and a fixed frame 106. In the present application, the torsion bars may be described as support portions.

The mirror 101 includes a reflective surface 14 that reflects light. The torsion bars 102a and 102b couple the mirror 101 to the first piezoelectric actuators 103a and 103b, and support the mirror 101 such that mirror 101 oscillates about the first axis. Specifically, one end of each of the torsion bars 102a and 102b is connected to the mirror 101, and one side of each of the torsion bars 102a and 102b is connected to the first piezoelectric actuators 103a and 103b.

The movable frame 104 supports the first piezoelectric actuators 103a and 103b and the second piezoelectric actuators 103c and 103d within the movable frame 104. Specifically, the movable frame 104 supports the first piezoelectric actuators 103a and 103b on the negative X-side within the movable frame 104, and supports the second piezoelectric actuators 103c and 103d on the positive X-side within the movable frame 104. The first piezoelectric actuators 103a and 103b and the second piezoelectric actuators 103c and 103d are disposed opposite to each other with respect to the first axis. More preferably, the first piezoelectric actuators 103a and 103b and the second piezoelectric actuators 103c and 103d are approximately symmetrical with respect to the first axis, which serves as the axis of symmetry). The second piezoelectric actuators 103c and 103d are not connected to the torsion bars 102a and 102b.

The third piezoelectric actuators 105a and 105b are disposed outside the movable frame 104. The third piezoelectric actuators 105a and 105b support the movable frame 104 such that the movable frame 104 is movable about the second axis. The third piezoelectric actuators 105a and 105b are provided between the movable frame 104 and the fixed frame 106. The fixed frame 106 supports the third piezoelectric actuators 105a and 105b. The first axis is perpendicular to the second axis. Further, the third piezoelectric actuators 105a and 105b include a plurality of beams that extend in the Y direction, and adjacent beams are connected by connection portions. The plurality of beams of the third piezoelectric actuators 105a and 105b are configured by piezoelectric drive portions. The piezoelectric drive portions of the third piezoelectric actuator 105a are divided into a piezoelectric drive portion group A and a piezoelectric drive portion group B, and the piezoelectric drive portions of the third piezoelectric actuator 105b are also divided into a piezoelectric drive portion group A and a piezoelectric drive portion group B. The piezoelectric drive portion groups A, B, A, B are alternately arranged. Although not illustrated, lower electrodes, piezoelectric portions, and upper electrodes are formed on the piezoelectric drive portions in this order.

Further, although not illustrated, lower electrodes, piezoelectric portions, and upper electrodes are formed on the first piezoelectric actuators 103a and 103b. Specifically, the lower electrodes are formed on the first piezoelectric actuators 103a and 103b, the piezoelectric portions are formed on the lower electrodes, and the upper electrodes are formed on the piezoelectric portions. When a drive voltage is applied to the first piezoelectric actuators 103a and 103b through the upper electrodes and the lower electrodes, the piezoelectric portions deform. The deformation of the piezoelectric portions causes the first piezoelectric actuators 103a and 103b supported by the movable frame 104 and connected to the torsion bars 102a and 102b to bend and deform. As a result, the torsion bars 102a and 102b twist.

The twisting of the torsion bars 102a and 102b generates a rotational force, thereby causing the mirror 101 to oscillate about the first axis in a bidirectional manner. The waveform of the drive voltage applied to the first piezoelectric actuators 103a and 103b is a sine wave, and the mirror 101 oscillates in a bidirectional manner in a cycle of the waveform of the drive voltage, which is the sine wave.

When a drive voltage is applied to the second piezoelectric actuators 103c and 103d through upper electrodes and lower electrodes, the piezoelectric portions deform. The deformation of the piezoelectric portions causes the second piezoelectric actuators 103c and 103d to bend and deform. However, because the second piezoelectric actuators 103c and 103d are not connected to the torsion bars 102a and 102b, a torque that would cause the mirror 101 to oscillate is not generated.

As described, when the drive voltages are applied, the first piezoelectric actuators 103a and 103b and the second piezoelectric actuators 103c and 103d supported by the movable frame 104 bend and deform. As a result, the oscillations of the first piezoelectric actuators 103a and 103b and the second piezoelectric actuators 103c and 103d are transmitted to the movable frame 104 and the third piezoelectric actuators 105a and 105b.

In the present embodiment, the waveform of an alternating current voltage applied to the first piezoelectric actuators 103a and 103b and the waveform of an alternating current voltage applied to the second piezoelectric actuators 103c and 103d are set to be approximately in phase, preferably set to be in phase. Accordingly, excessive rotational movement of the movable frame 104 about the first axis due to oscillations transmitted from the first piezoelectric actuators 103a and 103b and the second piezoelectric actuators 103c and 103d can be reduced. In addition, because excessive movement of the movable frame 104 can be reduced, the drive force of the first piezoelectric actuators 103a and 103b can be efficiently transmitted to the mirror 101. As a result, the driving sensitivity of the mirror 101 can be improved.

An oscillation system including the mirror 101, the torsion bars 102a and 102b, and the first piezoelectric actuators 103a and 103b is assumed to have a natural beam-bending frequency f1, and an oscillation system including the second piezoelectric actuators 103c and 103d is assumed to have a natural beam-bending frequency f2. The natural beam-bending frequency f2 of the oscillation system including the second piezoelectric actuators 103c and 103d is adjusted with respect to the natural beam-bending frequency f1 of the oscillation system including the mirror 101, the torsion bars 102a and 102b, and the first piezoelectric actuators 103a and 103b, such that the first piezoelectric actuators 103a and 103b and the second piezoelectric actuators 103c and 103d are driven in phase. Specifically, the natural beam-bending frequency f2 is adjusted to be equal to the natural beam-bending frequency f1, such that the first piezoelectric actuators 103a and 103b and the second piezoelectric actuators 103c and 103d are driven in phase. In this manner, excessive movement transmitted from the first piezoelectric actuators 103a and 103b to the movable frame 104 can be efficiently reduced.

For example, as illustrated in FIG. 3, the width and length of the second piezoelectric actuators 103c and 103d is set to be greater than those of the first piezoelectric actuators 103a and 103b, such that the moment of inertia of the second piezoelectric actuators 103c and 103d becomes larger than the moment of inertia of the first piezoelectric actuators 103a and 103b. In this manner, the natural beam-bending frequency f2 can be adjusted with respect to the natural beam-bending frequency f1. Note that the first piezoelectric actuators 103a and 103b and the second piezoelectric actuators 103c and 103d are preferably piezoelectric elements that have approximately the same characteristics. By using the piezoelectric elements having approximately the same characteristics, a high-quality image can be formed.

Figure 4A:
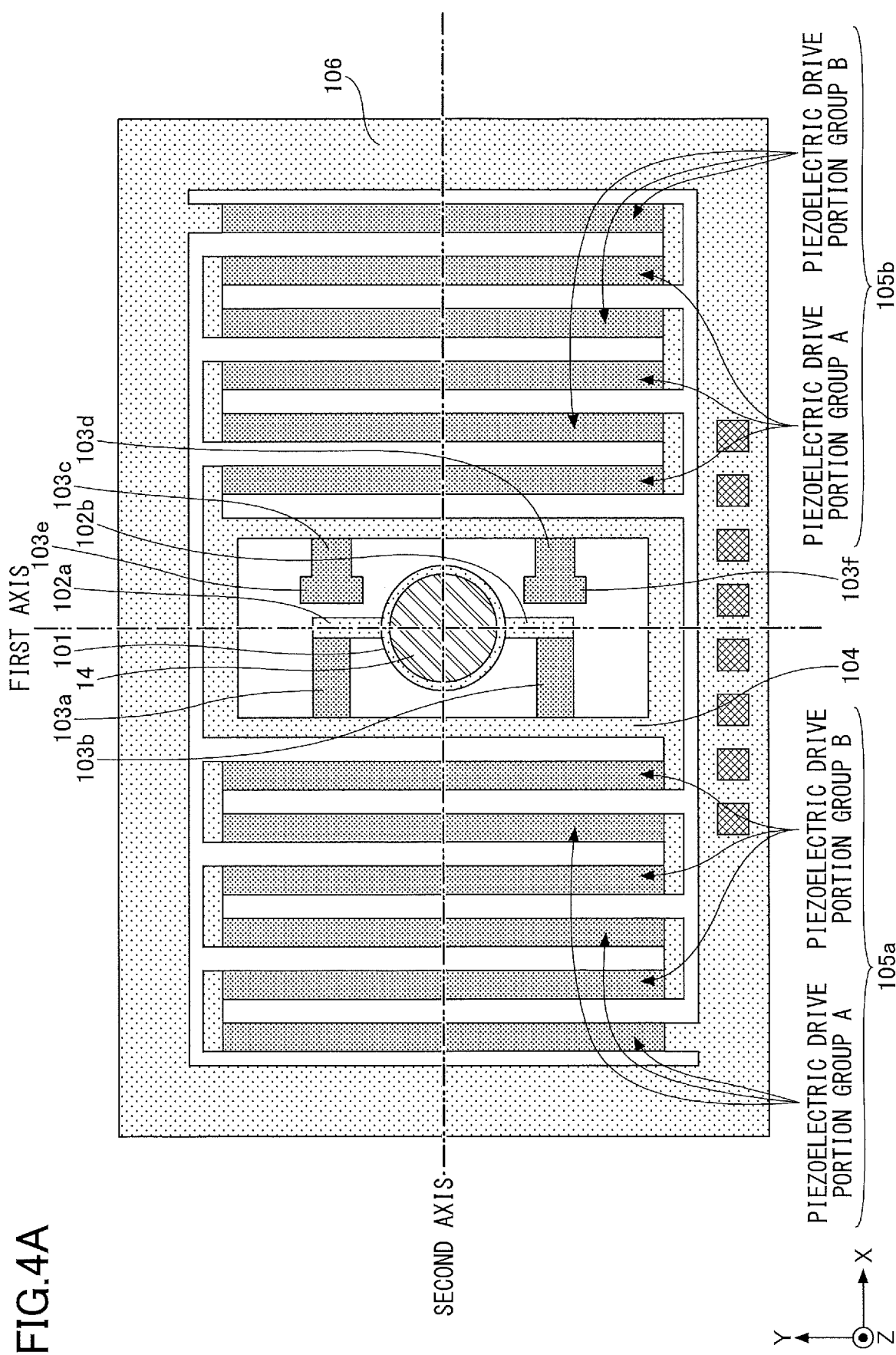
FIG. 4A is a structure diagram (2) illustrating the optical deflector according to the first embodiment.

Further, as illustrated in FIG. 4A and FIG. 4B, the second piezoelectric actuators 103c and 103d may have shapes in which end portions 103e and 103f located opposite to end portions connected to the movable frame 104 are wider than other portions. Accordingly, the moment of inertia of the second piezoelectric actuators 103c and 103d can be made large. In this manner, the natural beam-bending frequency f2 can be adjusted with respect to the natural beam-bending frequency f1 of the oscillation system including the first piezoelectric actuators 103a and 103b.

In this case, the side of each of the end portions 103e and 103f of the second piezoelectric actuators 103c and 103d closest to the mirror 101 is preferably formed along a part of the outer periphery of the mirror 101. For example, as illustrated in FIG. 4B, each of sides S1 and S2 of the end portions 103e and 103f facing and closest to the mirror 101 is preferably formed along the outer periphery of the mirror 101. Accordingly, the moment of inertia of the second piezoelectric actuators 103c and 103d can be made large, while the contact of the second piezoelectric actuators 103c and 103d with the mirror 101 can also be prevented. Thus, a high-quality image can be formed. Although FIG. 4B depicts the mirror 101 having a circular outer peripheral shape, the above description applies to a case where the mirror 101 has any outer peripheral shape other than the circular outer peripheral shape.

Next, the driving of the optical deflector according to the present embodiment will be described with reference to FIG. 5 and FIG. 6. FIG. 5 and FIG. 6 are cross-sectional views taken through dash-dot line 3A-3B of FIG. 3. FIG. 5 depicts a state in which the second piezoelectric actuators 103c and 103d are not driven. FIG. 6 depicts a state in which the second piezoelectric actuators 103c and 103d are driven.

In the example of FIG. 5, the first piezoelectric actuators 103a and 103b are driven without driving the second piezoelectric actuators 103c and 103d. In this case, a force is applied to the side of movable frame 104 connected to the first piezoelectric actuators 103a and 103b in a direction opposite to a force applied to the side of movable frame 104 connected to the second piezoelectric actuators 103c and 103d. The side of the movable frame 104 connected to the first piezoelectric actuators 103a and 103b and the side of movable frame 104 connected to the second piezoelectric actuators 103c and 103d are located opposite to each other with respect to the rotation axis (first axis). That is, as indicated by dashed arrows, when an upward force is applied to the side of the movable frame 104 connected to the first piezoelectric actuators 103a and 103b, a downward force is applied to the side of the movable frame 104 connected to the second piezoelectric actuators 103c and 103d.

Therefore, the moment of inertia about the rotation axis (first axis) is generated. In this case, in addition to the intended rotational movement of the mirror 101, excessive rotational movement would occur in the movable frame 104. As a result, there may be deviations of images formed by the optical deflector.

In the present embodiment, as illustrated in FIG. 6, the waveform of an alternating current voltage applied to the first piezoelectric actuators 103a and 103b and the waveform of an alternating current voltage applied to the second piezoelectric actuators 103c and 103d are in phase. In this case, as illustrated in FIG. 6, a force is applied to the side of the movable frame 104 connected to the first piezoelectric actuators 103a and 103b in the same direction as a force applied to the side of the movable frame 104 connected to the second piezoelectric actuators 103c and 103d. The side of the movable frame 104 connected to the first piezoelectric actuators 103a and 103b and the side of movable frame 104 connected to the second piezoelectric actuators 103c and 103d are located opposite to each other with respect to the rotation axis (first axis). That is, as indicated by dashed arrows, when a downward force is applied to the side of the movable frame 104 connected to the first piezoelectric actuators 103a and 103b, a downward force is also applied to the side of the movable frame 104 connected to the second piezoelectric actuators 103c and 103d. Accordingly, excessive rotational movement of the movable frame 104 about the first axis due to oscillations transmitted from the first piezoelectric actuators 103a and 103b and the second piezoelectric actuators 103c and 103d can be reduced.

That is, the natural beam-bending frequency f2 of the oscillation system including the second piezoelectric actuators 103c and 103d is adjusted to with respect to the natural beam-bending frequency f2 of the oscillation system including the second piezoelectric actuators 103c and 103d. Specifically, the natural beam-bending frequency f2 is adjusted to be equal to the natural beam-bending frequency f2, such that the first piezoelectric actuators 103a and 103b and the second piezoelectric actuators 103c and 103d are driven in phase. Accordingly, excessive movement transmitted from the first piezoelectric actuators 103a and 103b to the movable frame 104 can be efficiently reduced.

Further, because the first piezoelectric actuators 103a and 103b and the second piezoelectric actuators 103c and 103d are driven in phase, there is no need to additionally install a special drive circuit for phase adjustment. Therefore, the deterioration of the quality of an image due to the additional special drive circuit can be suppressed, and a high-quality image can be formed. Further, because an additional special drive circuit is not necessary, the size of the optical deflector can be reduced, and the driving of the optical deflector can also be facilitated.

FIG. 7 is a graph illustrating driving waveforms of the first piezoelectric actuators 103a and 103b and the second piezoelectric actuators 103c and 103d of the optical deflector according to the present embodiment. If it is difficult to adjust the natural frequencies f1 and f2, the drive voltage applied to the second piezoelectric actuators 103c and 103d can be adjusted. In this manner, the transmission of excess movement from the first piezoelectric actuators 103a and 103b to the movable frame 104 can be efficiently reduced, thereby allowing a high-quality image to be formed.

Specifically, if the natural frequency f1 and the natural frequency f2 are significantly shifted, the drive voltage of the second piezoelectric actuators 103c and 103d is adjusted with respect to the first piezoelectric actuators 103a and 103b. In this manner, a force applied to the side of the movable frame 104 connected to the first piezoelectric actuators 103a and 103b can be made equal to a force applied to the side of the movable frame 104 connected to the second piezoelectric actuators 103c and 103d. As a result, excessive rotational movement of the movable frame 104 can be reduced. The relationship between the drive voltages may be reversed, as long as forces acting on the sides of the movable frame 104 are equal to each other.

Note that the inventors of the present invention conducted a finite element simulation, and verified that excessive movement of the movable frame 104 can be reduced by half or more by adjusting the shape (the width and the length) and the drive voltage of the second piezoelectric actuators 103c and 103d.

Second Embodiment

Figure 8:
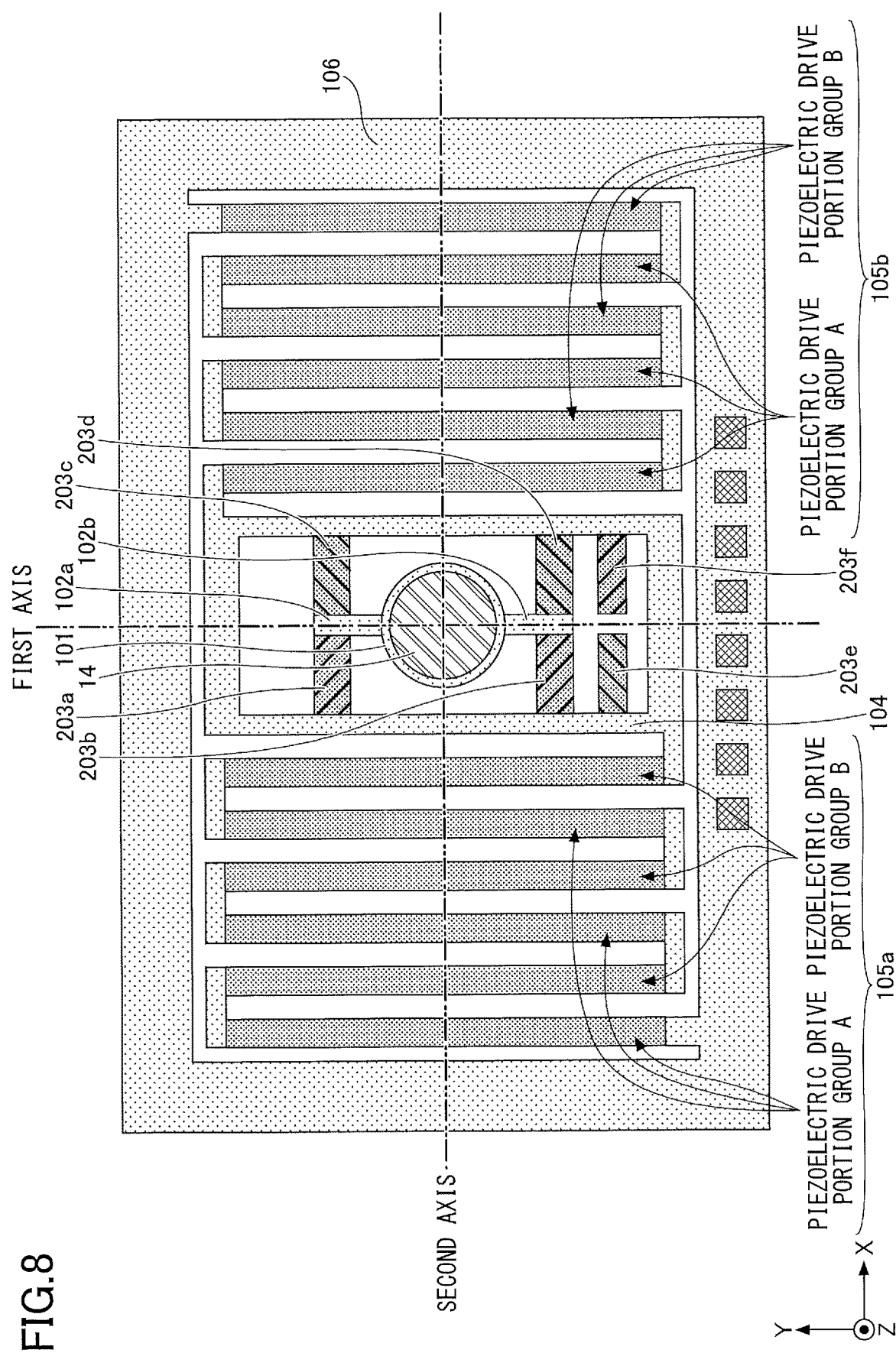
FIG. 8 is a structure diagram illustrating an optical deflector according to a second embodiment.

Next, an optical deflector according to a second embodiment will be described. The optical deflector according to the second embodiment is a two-dimensional optical deflector that uses piezoelectric actuator as illustrated in FIG. 8.

The optical deflector according to the second embodiment includes a mirror 101, a pair of torsion bars 102a and 102b, a pair of first piezoelectric actuators 203a and 203b, a pair of second piezoelectric actuators 203c and 203d, a fifth piezoelectric actuator 203e, a fourth piezoelectric actuator 203f, a movable frame 104, third piezoelectric actuators 105a and 105b, and a fixed frame 106.

The mirror 101 includes a reflective surface 14 that reflects light. One end of the torsion bar 102a is connected to the mirror 101, and sides of the torsion bar 102a are connected to the first piezoelectric actuator 203a and the second piezoelectric actuator 203c. One end of the torsion bar 102b is connected to the mirror 101, and sides of the torsion bar 102b are connected to the first piezoelectric actuator 203b and the second piezoelectric actuator 203d. The mirror 101 is supported by the pair of torsion bars 102a and 102b such that the mirror 101 oscillates about the first axis.

The movable frame 104 supports the first piezoelectric actuators 203a and 203b and the second piezoelectric actuators 203c and 203d within the movable frame 104. Specifically, the movable frame 104 supports the first piezoelectric actuators 203a and 203b on the negative X-side within the movable frame 104, and supports the second piezoelectric actuators 203c and 203d on the positive X-side within the movable frame 104.

Further, the movable frame 104 supports the fifth piezoelectric actuator 203e on the negative X-side within the movable frame 104, and the movable frame 104 supports the fourth piezoelectric actuator 203f on the positive X-side within the movable frame 104. The fifth piezoelectric actuator 203e and the fourth piezoelectric actuator 203f are not connected to the torsion bars 102a and 102b.

The third piezoelectric actuators 105a and 105b are disposed outside the movable frame 104. The third piezoelectric actuators 105a and 105b supports the movable frame 104 such that the movable frame 104 is movable about the second axis. The third piezoelectric actuators 105a and 105b are disposed between the movable frame 104 and the fixed frame 106. The fixed frame 106 supports the third piezoelectric actuators 105a and 105b.

When drive voltages are applied to the first piezoelectric actuators 203a and 203b and the second piezoelectric actuators 203c and 203d through upper electrodes and lower electrodes, piezoelectric portions deform. The deformation of the piezoelectric portions causes the first piezoelectric actuators 203a and 203b and the second piezoelectric actuators 203c and 203d, supported by the movable frame 104 and connected to the torsion bars 102a and 102b, to bend and deform. As a result the torsion bars 102a and 102b twist.

The twisting of the torsion bars 102a and 102b generates a rotational force, thereby causing the mirror 101 to oscillate about the first axis in a bidirectional manner. The waveforms of the drive voltages applied to the first piezoelectric actuators 203a and 203b and the second piezoelectric actuators 203c and 203d are sine waves. The waveform of the drive voltage applied to the first piezoelectric actuators 203a and 203b and the waveform of the drive voltage applied to the second piezoelectric actuators 203c and 203d are out of phase by 180 degrees. The mirror 101 oscillates in a bidirectional manner in a cycle of the waveforms of the drive voltages, which are sine waves.

When drive voltages are applied to the fifth piezoelectric actuator 203e and the fourth piezoelectric actuator 203f through upper electrodes and lower electrodes, the piezoelectric portions deform. The deformation of the piezoelectric portions causes the fifth piezoelectric actuator 203e and the fourth piezoelectric actuator 203f to bend and deform. However, because the fifth piezoelectric actuator 203e and the fourth piezoelectric actuator 203f are not connected to the torsion bars 102a and 102b, a torque that would cause the mirror 101 to oscillate is not generated.

When the drive voltages are applied, the first piezoelectric actuators 203a and 203b, the second piezoelectric actuators 203c and 203d, the fifth piezoelectric actuator 203e, and the fourth piezoelectric actuator 203f, which are supported by the movable frame 104 bend and deform. When the first piezoelectric actuators 203a and 203b, the second piezoelectric actuators 203c and 203d, the fifth piezoelectric actuator 203e, and the fourth piezoelectric actuator 203f bend and deform, oscillations are transmitted to the movable frame 104 and the third piezoelectric actuators 105a and 105b.

In the present embodiment, the waveform of an alternating current voltage applied to the first piezoelectric actuators 203a and 203b and the waveform of an alternating current voltage applied to the fourth piezoelectric actuator 203f are set to be in phase. In addition, the waveform of an alternating current voltage applied to the second piezoelectric actuators 203c and 203d and the waveform of an alternating current voltage applied to the fifth piezoelectric actuator 203e are set to be in phase. Accordingly, excessive rotational movement of the movable frame 104 about the first axis due to oscillations transmitted from the piezoelectric actuators 203a and 203b and the second piezoelectric actuators 203c and 203d to the movable frame 104 can be reduced.

Each of the optical deflectors according to the above-described embodiments can be applied to an optical scanning system, an image projecting apparatus, an optical writing apparatus, or a distance measuring apparatus.

[Optical Scanning System]

First, an optical scanning system to which a driving apparatus according to an embodiment of the present invention is applied will be described with reference to FIG. 9 through FIG. 12.

Figure 9:
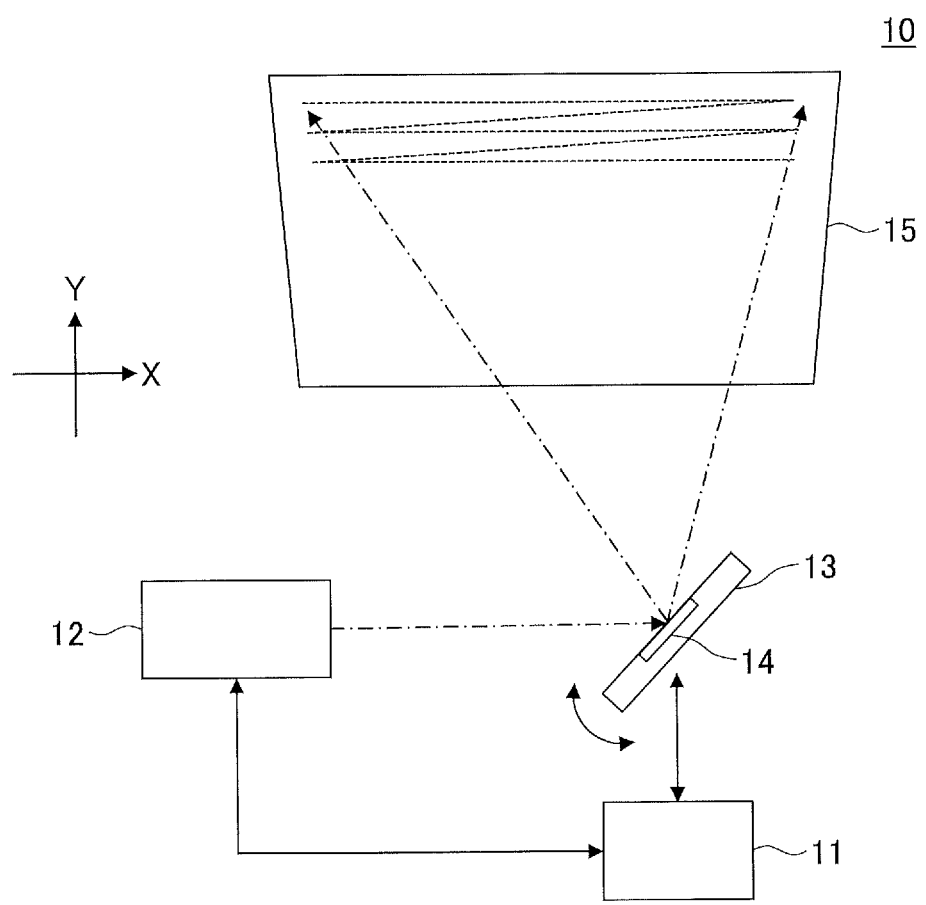
FIG. 9 is a schematic diagram illustrating an example of an optical scanning system.

FIG. 9 is a schematic diagram illustrating an example of an optical scanning system.

As illustrated in FIG. 9, an optical scanning system 10 causes light, emitted from a light source apparatus 12 as controlled by a driving apparatus 11, to be deflected by a reflective surface 14 of an optical deflector 13, and optically scans a scan surface 15.

The optical scanning system 10 includes the driving apparatus 11, the light source apparatus 12, and the optical deflector 13 having the reflective surface 14. The optical scanning system 10 is an example of a deflection apparatus according to an embodiment of the present invention.

The driving apparatus 11 may be an electronic circuit unit that includes a central processing unit (CPU) and a field-programmable gate array (FPGA). The optical deflector 13 may be a micro electromechanical system (MEMS) device having the reflective surface 14 and capable of moving the reflective surface 14. The light source apparatus 12 may be a laser apparatus that emits laser light. The scan surface 15 may be a screen.

The driving apparatus 11 generates control commands for the light source apparatus 12 and the optical deflector 13 based on optical scanning information acquired from an external device or the like, and outputs drive signals to the light source apparatus 12 and the optical deflector 13 based on the control signals.

The light source apparatus 12 emits light based on the drive signal input from the driving apparatus 11. The optical deflector 13 moves the reflective surface 14 at least either uniaxially or biaxially based on the drive signal input from the driving apparatus 11.

Accordingly, in order to perform optical scanning, the reflective surface 14 of the optical deflector 13 is biaxially moved in a bidirectional manner within a predetermined range and light emitted from the light source apparatus 12 is deflected by the reflective surface 14 as controlled by the driving apparatus 11 based on image information, which is an example of the optical scanning information. In this manner, an image can be projected onto the scan surface 15.

Note that the optical deflector 13 and the control of the driving apparatus 11 will be described later in detail.

Next, a hardware configuration of an example of the optical scanning system 10 will be described with reference to FIG. 10.

Figure 10:
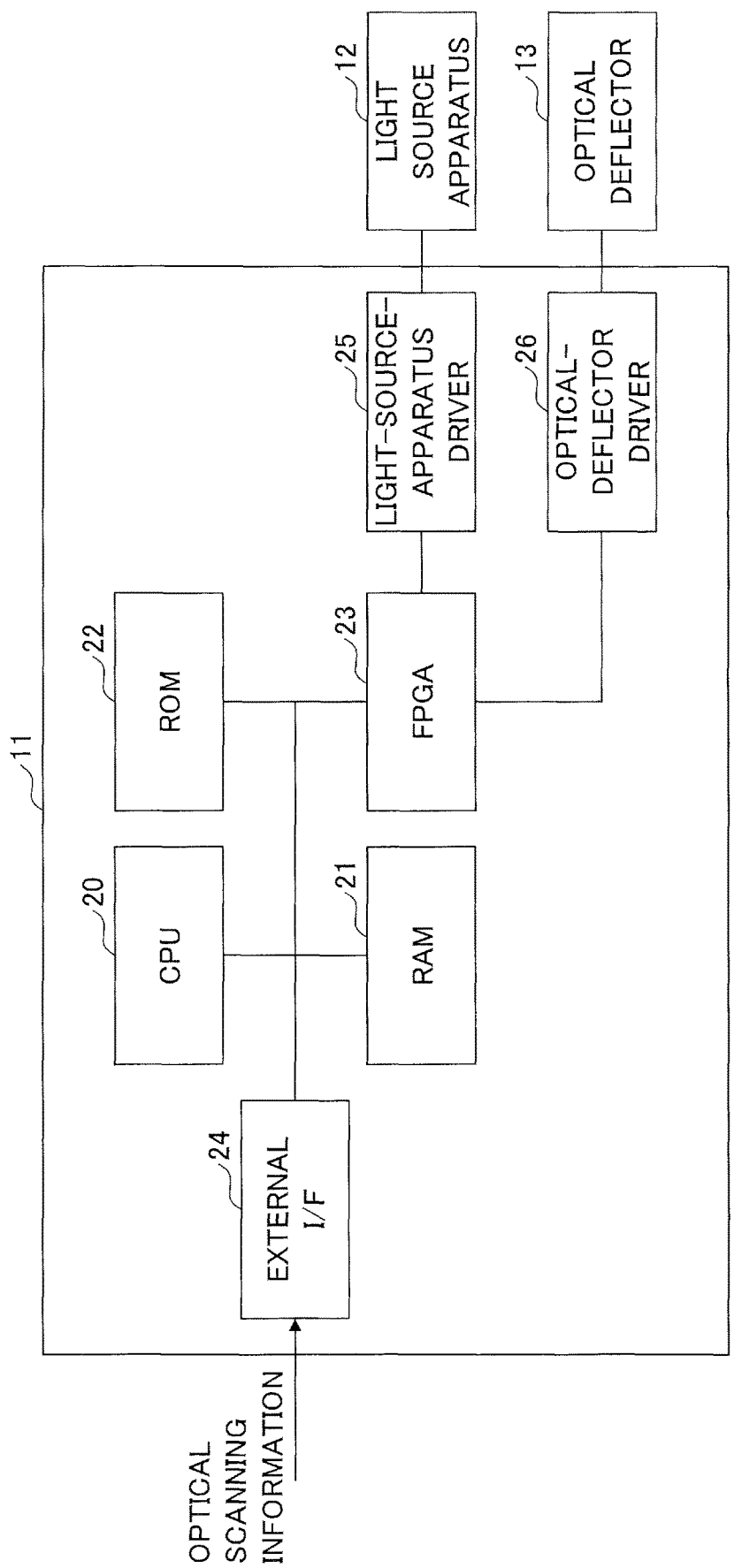
FIG. 10 is diagram illustrating an example of a hardware configuration of the optical scanning system.

FIG. 10 is diagram illustrating an example of a hardware configuration of the optical scanning system 10.

As illustrated in FIG. 10, the optical scanning system 10 includes the driving apparatus 11, the light source apparatus 12, and the optical deflector 13, which are electrically connected to each other.

[Driving Apparatus]

The driving apparatus 11 includes a CPU 20, a random-access memory (RAM) 21, a read-only memory (ROM) 22, an FPGA 23, an external interface (I/F) 24, a light-source-apparatus driver 25, and an optical-deflector driver 26.

The CPU 20 is an arithmetic device that reads programs and data from a storage device such as the ROM 22 onto the RAM 21, and perform processes to control the entirety of the driving apparatus 11 and to implement functions of the driving apparatus 11. The RAM 21 is a volatile storage device that temporarily retains programs and data.

The ROM 22 is a non-volatile storage device that can retain programs and data even when the power is turned off. The ROM 22 stores programs that are executed by the CPU 20 to control functions of the optical scanning system 10 and data.

The FPGA 23 is a circuit that outputs control signals that are appropriate for the light-source-apparatus driver 25 and the optical-deflector driver 26 in accordance with the processing of the CPU 20.

The external I/F 24 is, for example, an interface to an external device, a network, or the like. Examples of the external device include a host device, such as a personal computer (PC), and storage devices such as a universal serial bus (USB) memory, a secure digital (SD) card, a compact disc (CD), a digital versatile disc (DVD), a hard disk drive (HDD), and a solid-state drive (SSD). Examples of the network include a controller area network (CAN) for an automobile, a local area network (LAN), vehicle-to-vehicle (V2V) communication, and the Internet. The external I/F 24 may have any configuration that enables connection to or communication with an external device. In addition, the external I/F 24 may be provided for each external device.

The light-source-apparatus driver 25 is an electric circuit that outputs a drive signal such as a drive voltage to the light source apparatus 12 in accordance with a control signal that has been input.

The optical-deflector driver 26 is an electric circuit that outputs a drive signal such as a drive voltage to the optical deflector 13 in accordance with a control signal that has been input.

In the driving apparatus 11, the CPU 20 acquires optical scanning information from an external device or a network through the external I/F 24. Note that any configuration may be used as long as the CPU 20 can acquire optical scanning information. The optical scanning information may be stored in the ROM 22 or in the FPGA 23 of the driving apparatus 11, or a storage device such as an SSD may be additionally provided in the driving apparatus 11, and the optical scanning information may be stored in the storage device.

As used herein, the optical scanning information refers to information indicating a method for optically scanning the scan surface 15. For example, the optical scanning information is image data in a case where an image is displayed by optical scanning. Further, for example, the optical scanning information is writing data indicating the writing order and a portion to be written in a case where optical writing is performed by optical scanning. Further, for example, the optical scanning information is irradiation data indicating an irradiation timing and an irradiation range of light for object recognition in a case where an object is identified by optical scanning.

A functional configuration of the driving apparatus 11 according to the embodiment can be implemented by using commands from the CPU 20 and the hardware configuration illustrated in FIG. 10.

[Functional Configuration of Driving Apparatus]

Figure 11:
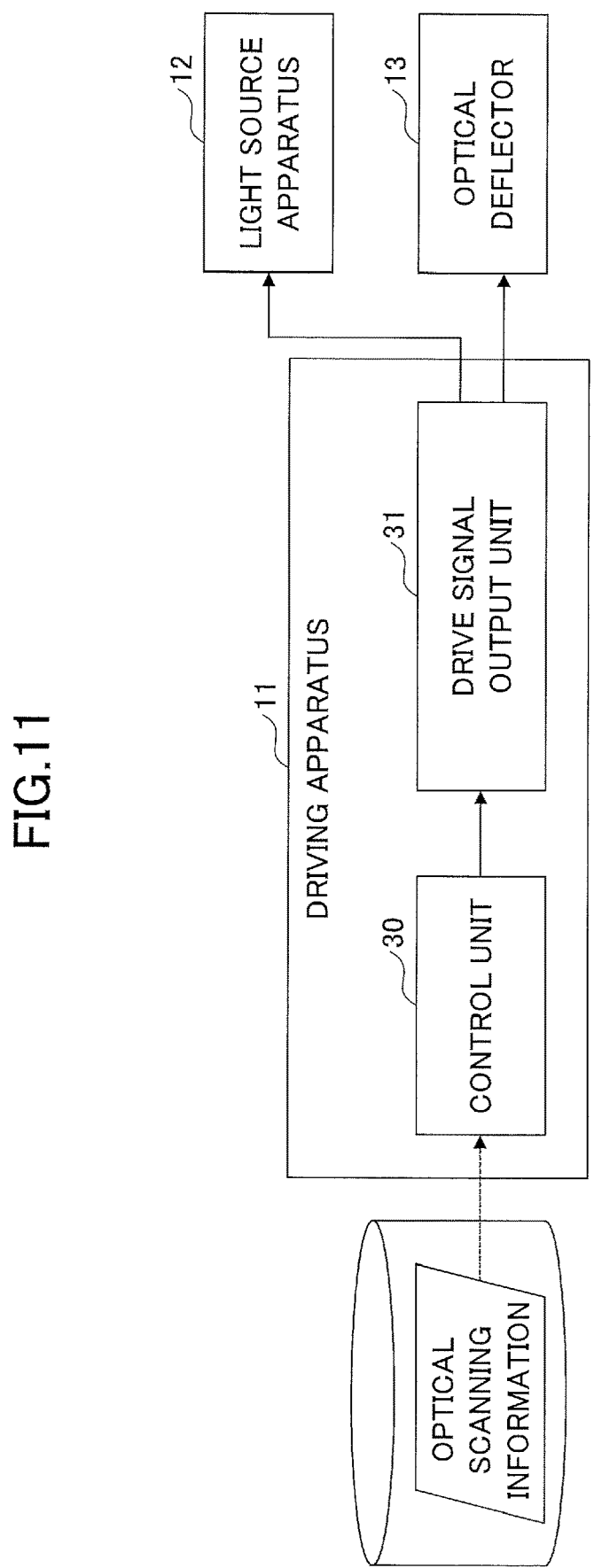
FIG. 11 is a functional block diagram of an example of a driving apparatus.

Next, a functional configuration of the driving apparatus 11 of the optical scanning system 10 will be described with reference to FIG. 11. FIG. 11 is a functional block diagram illustrating an example of the driving apparatus 11 of the optical scanning system 10.

As illustrated in FIG. 11, the driving apparatus 11 includes a control unit 30 and a drive signal output unit 31 as functions.

The control unit 30 is, for example, implemented by the CPU 20, the FPGA 23, or the like. The control unit 30 acquires optical scanning information from an external device, converts the optical scanning information into control signals, and outputs the control signals to the drive signal output unit 31. For example, the control unit 30 acquires image data from an external device as optical scanning information, generates control signals based on the image data by executing a predetermined process, and outputs the control signals to the output unit 31.

The drive signal output unit 31 is implemented by the light-source-apparatus driver 25, the optical-deflector driver 26, and the like. The drive signal output unit 31 outputs drive signals to the light source apparatus 12 and the optical deflector 13 based on the control signals that have been input. The drive signal output unit 31 may be provided for each destination to which a drive signal is output.

Note that a drive signal is a signal for controlling the driving of the light source apparatus 12 or the optical deflector 13. For example, a drive signal of the light source apparatus 12 is a drive voltage for controlling the irradiation timing and the irradiation intensity of the light source. For example, a drive signal of the optical deflector 13 is a drive voltage for controlling the timing and the movable range of the reflective surface 14 of the optical deflector 13. Note that the driving apparatus 11 may acquire a timing at which the light source apparatus 12 emits light and a timing at which an external device such as a light detecting device receives the light, and may synchronize the timings with the driving of the optical deflector 13.

[Optical Scanning Process]

Figure 12:
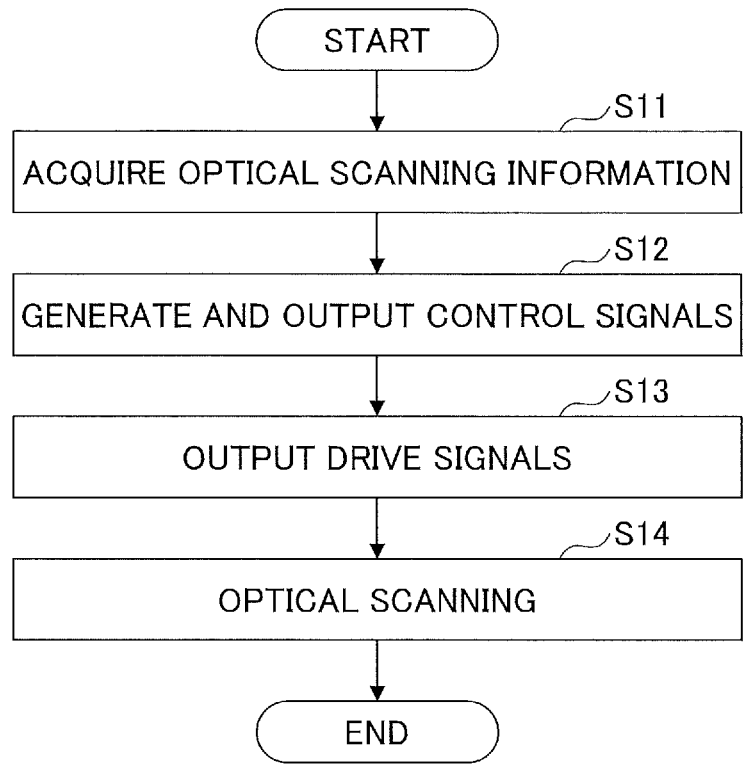
FIG. 12 is a flowchart illustrating a process performed by the optical scanning system.

Next, a process for optically scanning the scan surface 15 by the optical scanning system 10 will be described with reference to FIG. 12. FIG. 12 is a flowchart illustrating a process performed by the optical scanning system 10.

In step S11, the control unit 30 acquires optical scanning information from an external device.

In step S12, the control unit 30 generates control signals from the acquired optical scanning information, and outputs the control signals to the drive signal output unit 31.

In step S13, the drive signal output unit 31 outputs drive signals to the light source apparatus 12 and the optical deflector 13 based on the control signals that have been input.

In step S14, the light source apparatus 12 emits light in accordance with the drive signal that has been input. In addition, the optical deflector 13 moves the reflective surface 14 in accordance with the drive signal that has been input. By driving the light source apparatus 12 and the optical deflector 13, the light is deflected in a given direction and optical scanning is performed.

Note that in the above-described optical scanning system 10, the one driving apparatus 11 includes the devices and the functions for controlling the light source apparatus 12 and the optical deflector 13. However, a driving apparatus for the light source apparatus and a driving apparatus for the optical deflector may be separately provided.

In addition, in the above-described optical scanning system 10, the one driving apparatus 11 includes functions of the control unit 30 and functions of the drive signal output unit 31 for the light source apparatus 12 and the optical deflector 13. However, these functions may be separately provided. For example, a drive signal output device including the drive signal output unit 31 may be provided separately from the driving apparatus 11 including the control unit 30. Further, the optical scanning system 10 may be an optical scanning system that includes the optical deflector 13, having the reflective surface 14, and the driving apparatus 11, and that is configured to deflect light.

By employing the optical deflector according to the embodiment in the optical scanning system, a high-quality image can be formed by optical scanning.

[Image Projecting Apparatus]

Next, an image projecting apparatus to which the driving apparatus 11 according to the embodiment is applied will be described with reference to FIG. 13 and FIG. 14.

Figure 13:
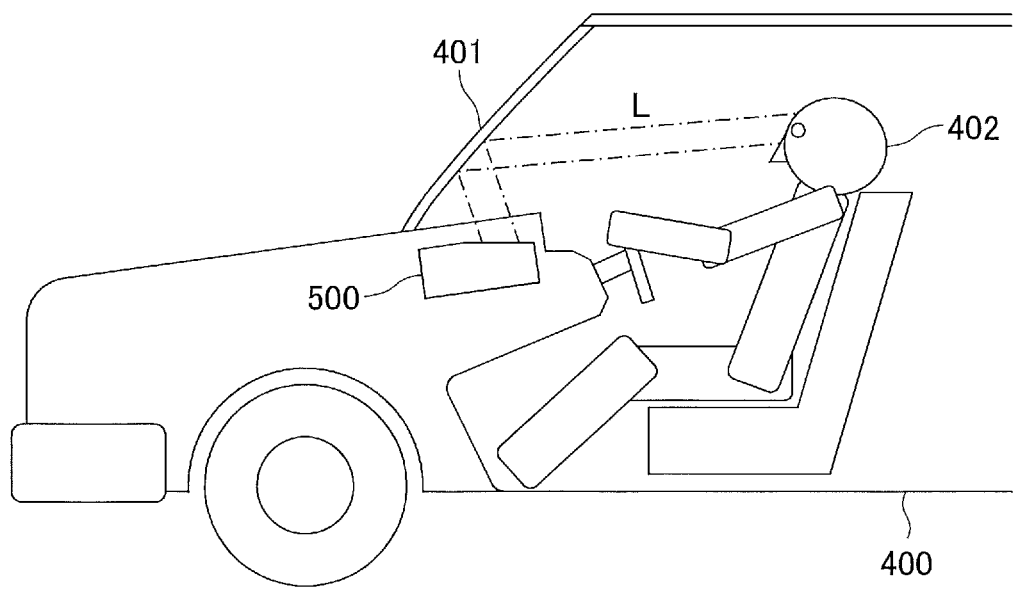
FIG. 13 is a schematic diagram illustrating an automobile in which a head-up display apparatus is mounted.

FIG. 13 is a schematic diagram illustrating an automobile 400 in which a head-up display apparatus 500, which is an example of the image projecting apparatus, is mounted. FIG. 14 is a schematic diagram illustrating an example of the head-up display apparatus 500.

The image projecting apparatus is an apparatus that performs optical scanning to project an image. The image projecting apparatus may be a head-up display apparatus.

As illustrated in FIG. 13, the head-up display apparatus 500 is provided near a windshield (e.g., a windshield 401) of the automobile 400. Projection light L, emitted from the head-up display apparatus 500, is reflected by the windshield 401 toward a viewer (a user) who is a driver 402.

Accordingly, the driver 402 can visually recognize the image projected by the head-up display apparatus 500 as a virtual image. Further, a combiner may be disposed on the inner wall of the windshield 401 such that the driver 402 may visually recognize a virtual image formed by projection light reflected from the combiner.

Figure 14:
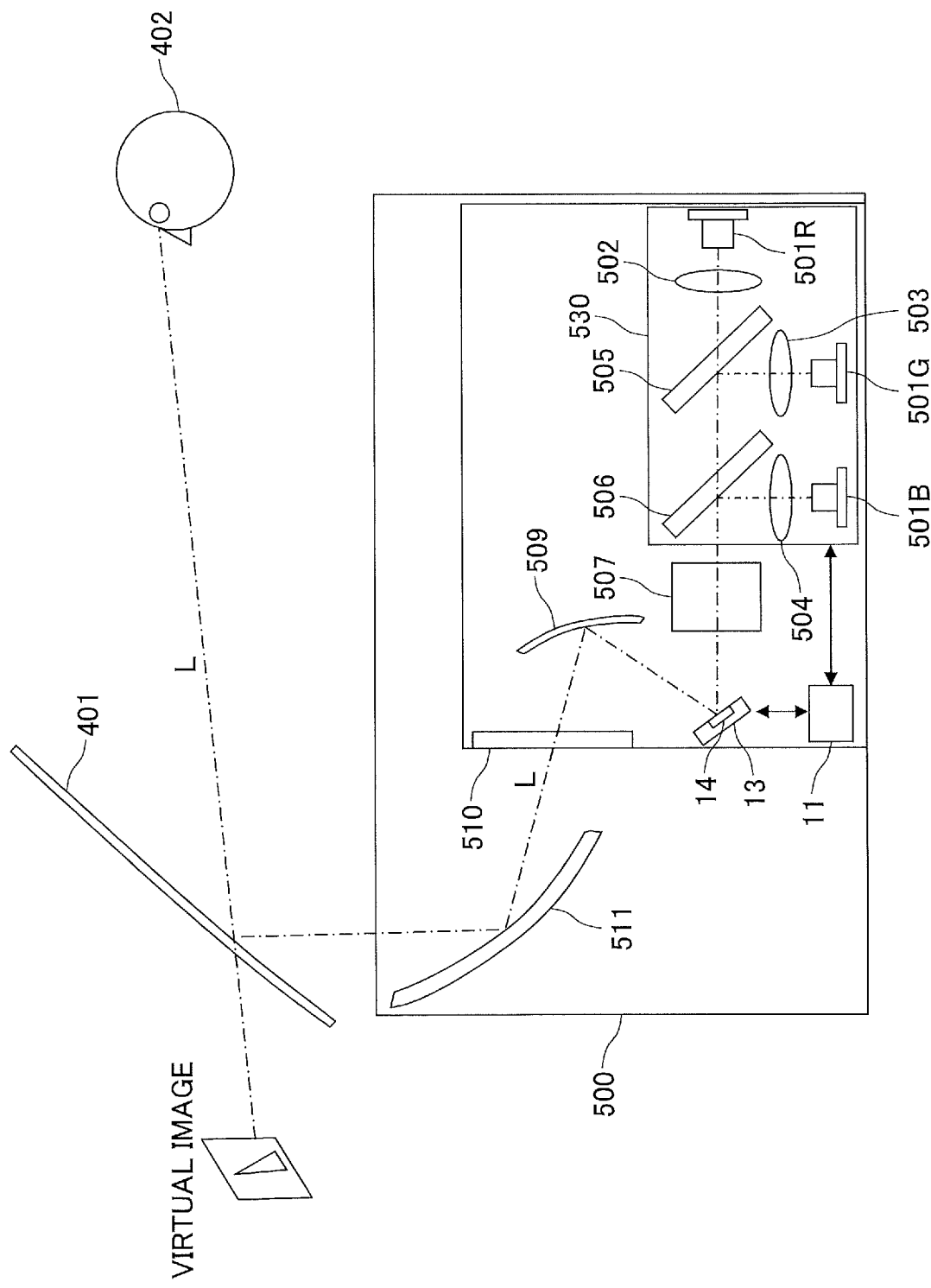
FIG. 14 is a schematic diagram illustrating an example of the head-up display apparatus.

As illustrated in FIG. 14, the head-up display apparatus 500 emits laser beams from red, green, and blue laser light sources 501R, 501G, and 501B. The emitted laser beams travel through an incident optical system, and is deflected by the optical deflector 13 having the reflective surface 14. The incident optical system includes collimator lenses 502, 503, and 504, which are provided for the respective laser light sources, two dichroic mirrors 505 and 506, and a light quantity adjuster 507.

The deflected laser beams travel through a projection optical system, and are projected onto the windshield 401. The projection optical system includes a free-form mirror 509, an intermediate screen 510, and a projection mirror 511.

Note that, in the above-described head-up display apparatus 500, the laser light sources 501R, 501G, and 501B, the collimator lenses 502, 503, and 504, and the dichroic mirrors 505 and 506 are formed as a light source unit 530 in an optical housing.

The head-up display apparatus 500 projects an intermediate image, displayed on the intermediate screen 510, onto the windshield 401 of the automobile 400, thereby allowing the driver 402 to view the intermediate image as a virtual image.

The laser beams of the respective colors emitted from the laser light sources 501R, 501G, and 501B are approximately collimated by the collimator lenses 502, 503, and 504, respectively, and are combined by the two dichroic mirrors 505 and 506. The quantity of the combined laser beam is adjusted by the light quantity adjuster 207, and subsequently, the adjusted laser beam is two-dimensionally scanned by the optical deflector 13. The projection light L two-dimensionally scanned by the optical deflector 13 is reflected by the free-form mirror 509, and condensed onto the intermediate screen 510 after a distortion is corrected. Accordingly, the intermediate image is displayed. The intermediate screen 510 includes a microlens array where a plurality of microlenses are two-dimensionally arranged, which magnifies the projection light L entering the intermediate screen 510 on a per-microlens basis.

The optical deflector 13 moves the reflective surface 14 biaxially in a bidirectional manner, and two-dimensionally scans the projection light L incident on the reflective surface 14. The optical deflector 13 is driven and controlled in synchronization with a timing at which the laser light sources 501R, 501G, and 501B emit the laser beams.

Although the head-up display apparatus 500 as an example of the image projecting apparatus has been described above, the image projecting apparatus may be any apparatus that performs optical scanning by using the optical deflector 13 having the reflective surface 14 to project an image.

For example, the image projecting apparatus may be similarly applied to a projector that is placed on a desk or the like, and projects an image onto a display screen. Further, the image projecting apparatus may be similarly applied to a head-mounted display that is mounted on a wearable member on the head of the user, and projects an image on a light transmission screen of the wearable member or on an eye ball as a screen.

In addition, the image projecting apparatus may be installed not only in a vehicle, but also in a movable object such as an aircraft, a ship, and a mobile robot or in a non-movable body such as a working robot that manipulates an object such as a manipulator without moving out of the site.

By employing the optical deflector according to the embodiment in the image projecting apparatus, a high-quality image can be projected.

[Optical Writing Apparatus]

Next, an optical writing apparatus to which the driving apparatus 11 according to the embodiment is applied will be described with reference to FIG. 15 and FIG. 16.

Figure 15:
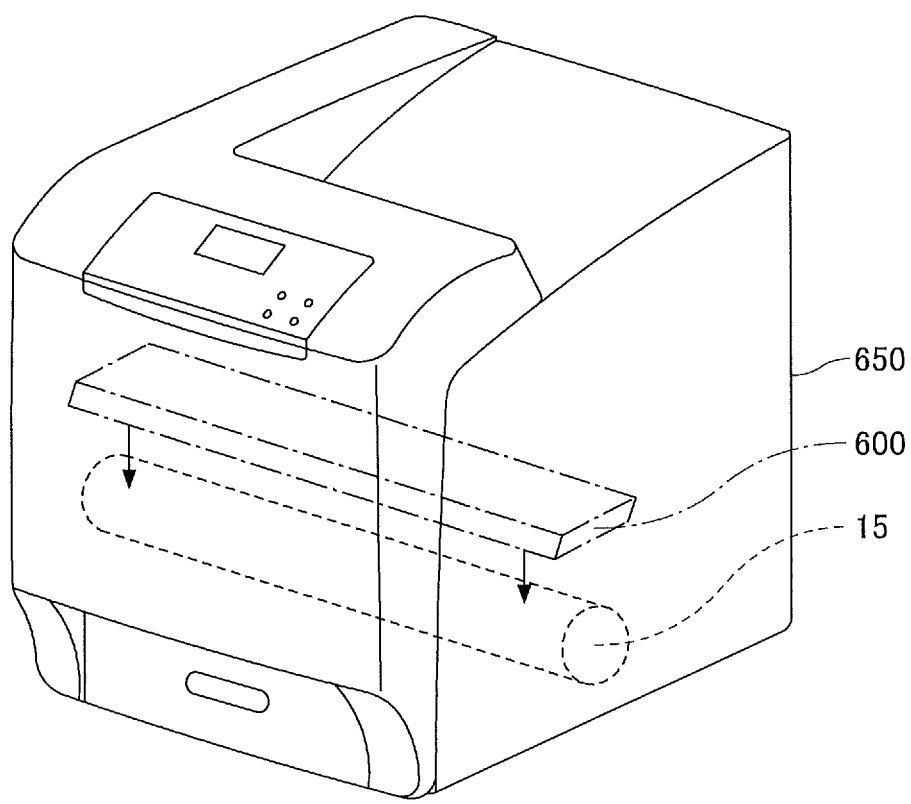
FIG. 15 is a schematic diagram illustrating an example of an image forming apparatus including an optical writing apparatus.

FIG. 15 is a schematic diagram illustrating an example of an image forming apparatus including an optical writing apparatus 600. FIG. 16 is a schematic diagram illustrating an example of the optical writing apparatus 600.

As illustrated in FIG. 15, the optical writing apparatus 600 is used as a component of an image forming apparatus. The image forming apparatus is typically a laser printer 650 having a printer function using laser light. In the image forming apparatus, the optical writing apparatus 600 optically scans a photoconductor drum, which is a scan surface 15, with one or more laser beams, thereby performing optical writing on the photoconductor drum.

Figure 16:
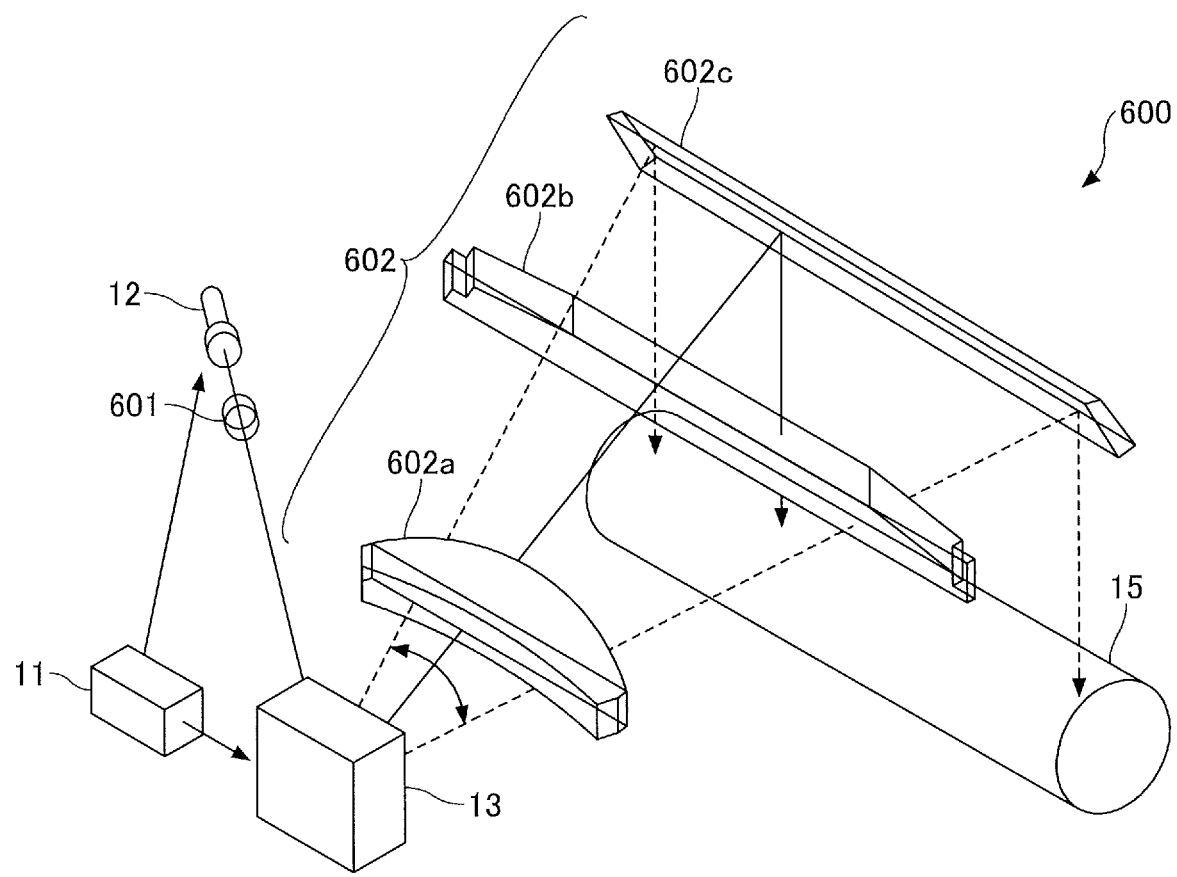
FIG. 16 is a schematic diagram illustrating an example of the optical writing apparatus.

As illustrated in FIG. 16, in the optical writing apparatus 600, laser light emitted from the light source apparatus 12 such as a laser element travels through an image forming optical system 601 such as a collimator lens, and is then deflected uniaxially or biaxially by the optical deflector 13 having the reflective surface 14.

The laser light deflected by the optical deflector 13 travels through a scanning optical system 602 configured by a first lens 602a, a second lens 602b, and a reflective mirror 602c, and is emitted onto the scan surface 15 (e.g., the photoconductor drum or a photoconductor sheet), thereby performing optical writing. The scanning optical system 602 forms a light beam in the form of a spot on the scan surface 15.

The light source apparatus 12 and the optical deflector 13 having the reflective surface 14 are driven as controlled by the driving apparatus 11.

Accordingly, the optical writing apparatus 600 can be used as a component of the image forming apparatus having a printer function using laser light.

In addition, by modifying the scanning optical system so as to enable not only uniaxial optical scanning, but also biaxial optical scanning, the optical writing apparatus 600 can be used as a component of an image forming apparatus, such as a laser labelling apparatus that deflects laser beams to perform optical scanning on a thermal medium and print letters by heating.

The optical deflector 13 having the reflective surface 14 employed in the optical writing apparatus requires less power to operate as compared to a rotating polygon mirror, and is thus advantageous in reducing the power consumed by the optical writing apparatus.

Further, the optical deflector 13 is of a smaller noise than a noise of a rotating polygon mirror, and is thus advantageous in reducing a noise of the optical writing apparatus. The optical writing apparatus requires a considerably smaller installation space than the rotating polygon mirror, and further less heat is generated by the optical deflector 13. Thus, the optical writing apparatus can be easily downsized, which is advantageous in downsizing the image forming apparatus.

By employing the optical deflector according to the embodiment in the optical writing apparatus, a high-quality image can be optically written.

[Distance Measuring Apparatus]

Next, a distance measuring apparatus to which the driving apparatus according to the embodiment is applied will be described in detail with reference to FIG. 17 and FIG. 18

Figure 17:
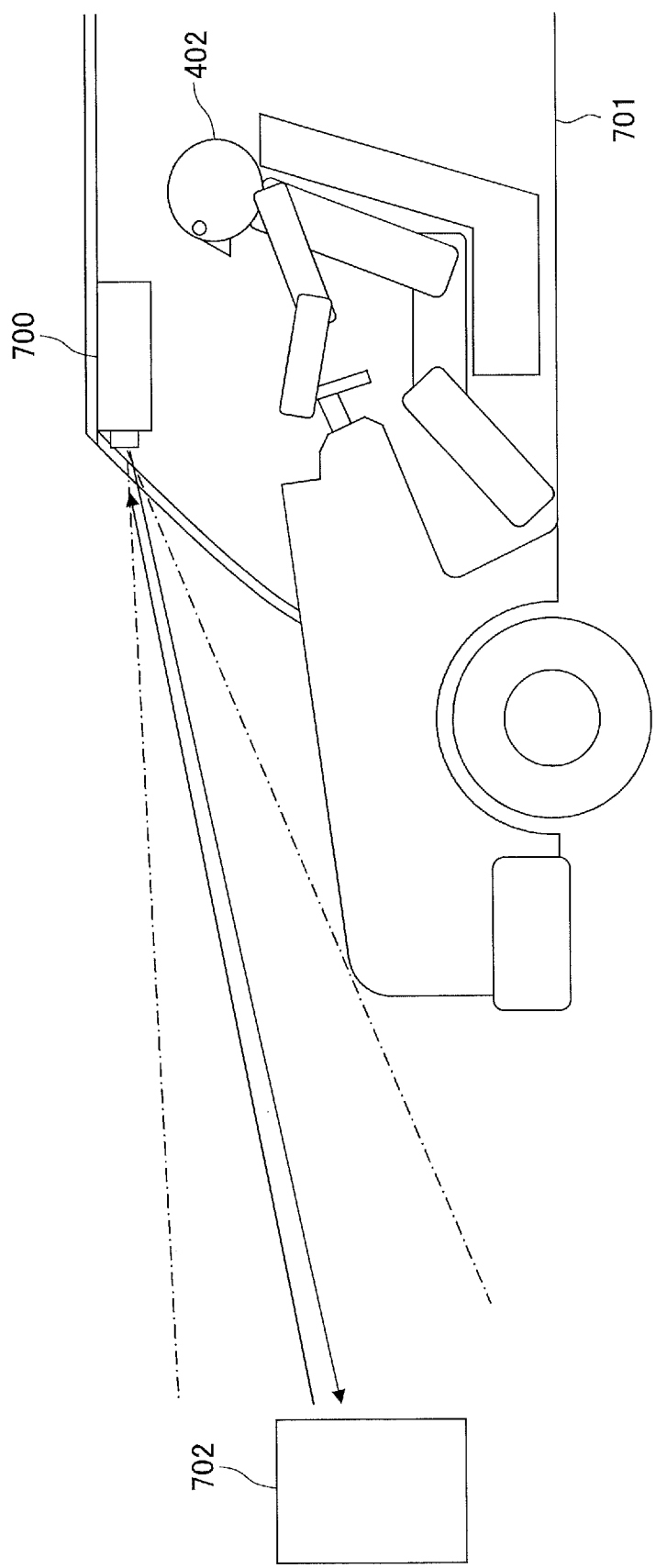
FIG. 17 is a schematic diagram illustrating an automobile in which a lidar apparatus is mounted.

FIG. 17 is a schematic diagram illustrating an automobile in which a lidar (laser imaging detection and Ranging) apparatus, which is an example of the distance measuring apparatus, is mounted. FIG. 18 is a schematic diagram illustrating an example of the lidar apparatus.

As illustrated in FIG. 17, a lidar apparatus 700 is mounted on an automobile 701, for example. The lidar apparatus 700 performs optical scanning in a target direction, and receives light reflected from an object 702 located in the target direction, thereby identifying the object 702. Further, in order to collect information in the moving direction, the lidar apparatus 700 may be provided in a lamp unit that includes headlamps for the automobile. Further, four lidar apparatuses may be provided at the front, rear, left, and right sides of the automobile. The lidar apparatus 700 is not necessarily mounted on the automobile, and may be mounted on a measurement vehicle for collecting information on roads and objects, or may be mounted on a movable body such as a vehicle for transporting passengers or cargo.

Figure 18:
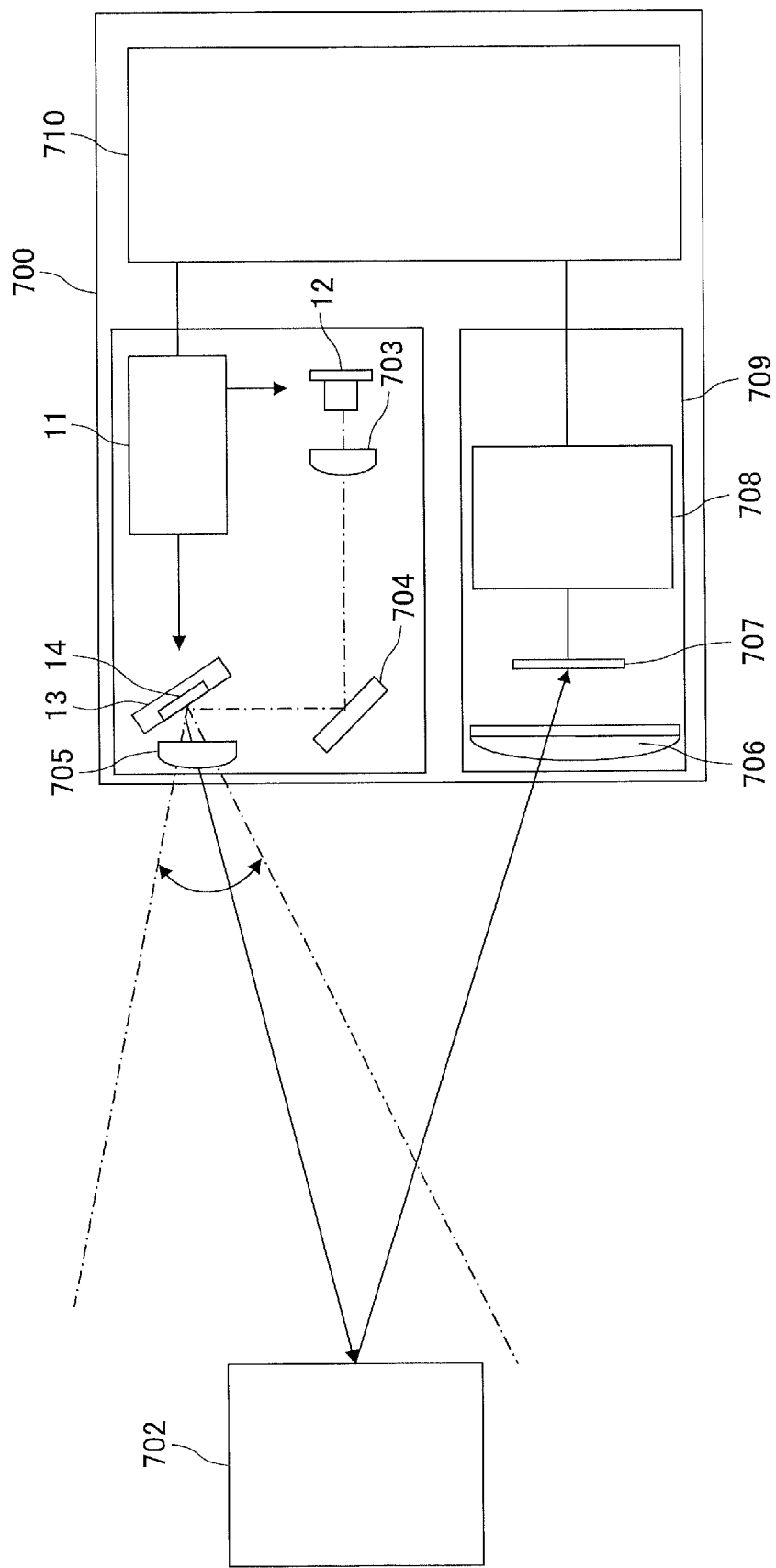
FIG. 18 is a schematic diagram illustrating an example of the lidar apparatus.

As illustrated in FIG. 18, laser light emitted from the light source apparatus 12 travels through an incident optical system configured by a collimator lens 703, which is an optical system for approximately collimating diverging light, and a planar mirror 704, and is uniaxially or biaxially deflected by the optical deflector 13 having the reflective surface 14. Then, the laser light is emitted through a projection lens 705, which is a projection optical system, onto the object 702 located ahead of the automobile 701. The driving of the light source apparatus 12 and the optical deflector 13 are controlled by the driving apparatus 11. The light reflected from the object 702 is detected by a photodetector 709.

Specifically, the reflected light travels through a condenser lens 706, which is a reception optical system, and is received by an imaging element 707. The imaging element 707 outputs a detection signal to a signal processing circuit 708. The signal processing circuit 708 performs predetermined processing on the detection signal, such as binarization and noise processing, and outputs the results to a distance measuring circuit 710.

The distance measuring circuit 710 identifies the object 702 based on the time difference between the timing at which the light source apparatus 12 emits laser light and the timing at which the photodetector 709 receives the laser light or based on the phase difference among pixels of the imaging element 707 that receives light, and calculates the distance to the object 702.

The optical deflector 13 having the reflective surface 14 is less likely to break and is compact, as compared to a polygon mirror, and thus, a highly durable and compact radar can be provided.

The lidar apparatus 700 may be mounted on a vehicle, an aircraft, a vessel, a robot, or the like, and can determine whether there is an obstacle and, if any, can identify the distance to the obstacle by performing optical scanning within a predetermined range. Although the lidar apparatus 700 has been described as an example of the distance measuring apparatus, the distance measuring apparatus is not limited to the lidar apparatus 700. The distance measuring apparatus may be any apparatus in which optical scanning is performed by using the driving apparatus 11 to control the optical deflector 13 having the reflective surface 14, and reflected light is received by the photodetector such that the object 702 is identified.

For example, the distance measuring apparatus may be applied to a biometric authentication apparatus, a security sensor, or a component of a three-dimensional scanner. The biometric authentication apparatus identifies an object by calculating object information such as the shape of the object based on distance information obtained by optically scanning a hand or a face, and referring to records. The security sensor identifies an incoming object by performing optical scanning within a target range. The three-dimensional scanner identifies an object by calculating object information such as the shape of an object based on distance information obtained by optical scanning, and outputs three-dimensional data.

By employing the optical deflector according to the embodiment in the distance measuring apparatus, an object can be identified with high accuracy and the distance to the object can be calculated with high accuracy.

[Packaging]

Next, packaging of the optical deflector controlled by the driving apparatus will be described with reference to FIG. 19.

Figure 19:
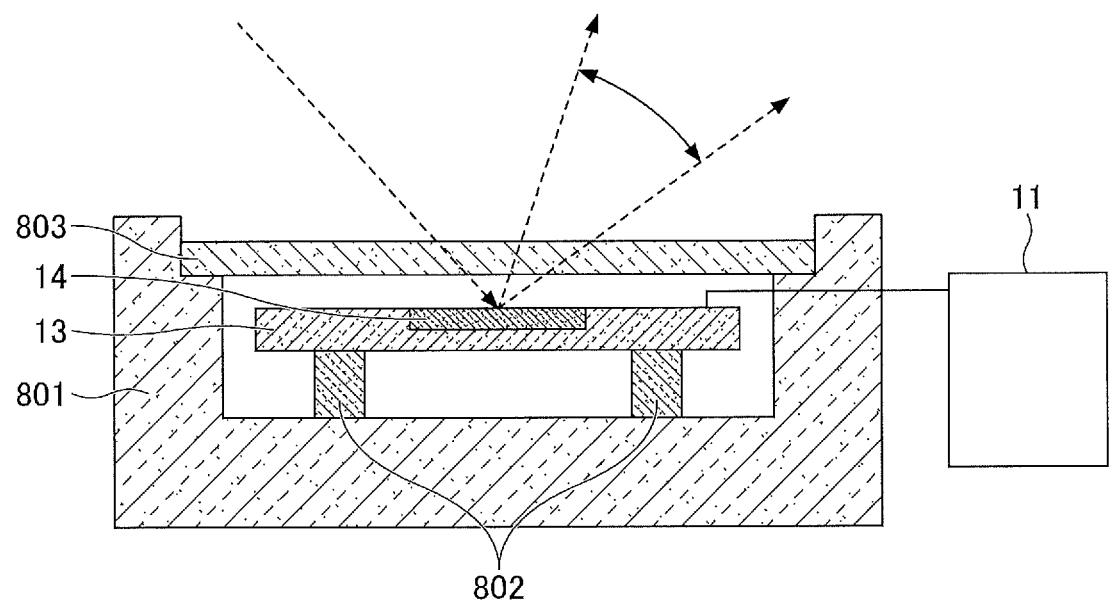
FIG. 19 is a schematic diagram illustrating an example of a packaged optical deflector.

FIG. 19 is a schematic diagram illustrating an example of the packaged optical deflector.

As illustrated in FIG. 19, the optical deflector 13 is attached to attachment members 802 disposed within a package member 801. The package member 801 is partially covered with and sealed by a transmissive member 803. In this manner, the optical deflector 13 is packaged.

In addition, an inert gas such as nitrogen is sealed in the package. Accordingly, deterioration of the optical deflector 13 due to oxidation can be suppressed, and further, the durability against environmental changes such as temperature changes can be increased.

According to at least one embodiment, an optical deflector that enables the formation of a high-quality image can be provided.

Further, the present invention is not limited to these embodiments, and variations and modifications may be made without departing from the scope of the present invention.

What is claimed is:
1. An optical deflector comprising:
a mirror configured to reflect light;

a pair of support portions each having an end connected to the mirror, the pair of support portions being configured to support the mirror;

first actuators connected to the respective support portions, and configured to deform the support portions so as to cause the mirror to oscillate about a first axis;

a movable frame configured to support the first actuators; and second actuators each including first ends connected to the movable frame, wherein the second actuators are disposed opposite to the first actuators, with the support portions being interposed between the first actuators and the second actuators, wherein the second actuators each include second ends, wherein a gap is interposed between the support portions and each of the second ends of each of the second actuators, such that the second actuators are not contacting the support portions, and the first actuators and the second actuators bend and deform in a same direction.

2. The optical deflector according to claim 1, wherein the first actuators and the second actuators bend and deform in phase.

3. The optical deflector according to claim 1, further comprising third actuators each having a first end connected to the movable frame, and configured to support the movable frame, and a fixed frame connected to a second end of each of the third actuators, wherein the third actuators support the movable frame such that the movable frame is movable about a second axis that is perpendicular to the first axis.

4. The optical deflector according to claim 1, wherein the first actuators and the second actuators are symmetrical with respect to the first axis, the first axis serving as an axis of symmetry.

5. The optical deflector according to claim 4, wherein the first actuators have shapes different from shapes of the second actuators.

6. The optical deflector according to claim 5, wherein a side of each of the second actuators closest to the mirror is formed along a part of an outer periphery of the mirror.

7. A deflection apparatus comprising:

the optical deflector according to claim 1; and a light source.

8. A distance measuring apparatus comprising, the optical deflector according to claim 1.

9. An image projecting apparatus comprising, the optical deflector according to claim 1.

10. A movable body comprising, the distance measuring apparatus according to claim 8.

11. A movable body comprising, the image projecting apparatus according to claim 9.

* * * * *